(12) United States Patent
Cao et al.

(10) Patent No.: US 12,063,386 B2
(45) Date of Patent: Aug. 13, 2024

(54) METHODS, APPARATUSES, DEVICES, AND STORAGE MEDIA FOR ENCODING OR DECODING

(71) Applicant: HANGZHOU HIKVISION DIGITAL TECHNOLOGY CO., LTD., Hangzhou (CN)

(72) Inventors: Xiaoqiang Cao, Hangzhou (CN); Yucheng Sun, Hangzhou (CN); Fangdong Chen, Hangzhou (CN)

(73) Assignee: HANGZHOU HIKVISION DIGITAL TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 18/548,785

(22) PCT Filed: Mar. 14, 2022

(86) PCT No.: PCT/CN2022/080697
§ 371 (c)(1),
(2) Date: Sep. 1, 2023

(87) PCT Pub. No.: WO2022/194103
PCT Pub. Date: Sep. 22, 2022

(65) Prior Publication Data
US 2024/0171770 A1 May 23, 2024

(30) Foreign Application Priority Data
Mar. 19, 2021 (CN) .......................... 202110297136.3

(51) Int. Cl.
*H04N 11/02* (2006.01)
*H04N 19/109* (2014.01)
(Continued)

(52) U.S. Cl.
CPC ............ *H04N 19/52* (2014.11); *H04N 19/109* (2014.11); *H04N 19/13* (2014.11); *H04N 19/139* (2014.11);
(Continued)

(58) Field of Classification Search
CPC ...................................................... H04N 19/52
(Continued)

(56) References Cited

U.S. PATENT DOCUMENTS

2006/0133501 A1  6/2006  Lee et al.
2007/0297509 A1  12/2007  Mizobuchi et al.
(Continued)

FOREIGN PATENT DOCUMENTS

CA        2543947     10/2006
CN       108293131     7/2018
(Continued)

OTHER PUBLICATIONS

Office Action in Australian Appln. No. 2022235881, mailed on Sep. 8, 2023, 3 pages.
(Continued)

*Primary Examiner* — Leron Beck
(74) *Attorney, Agent, or Firm* — Fish & Richardson P.C.

(57) ABSTRACT

Methods, apparatuses, devices and storage media for decoding and encoding are provided. In one aspect, a decoding method includes: obtaining a value of an Enhanced Temporal Motion Vector Prediction (ETMVP) mode flag and an ETMVP mode index value for a current coding unit (CU); when the value of the ETMVP mode flag is a first value, determining coordinate information of an initial matching CU of the current CU according to coordinate information of the current CU; constructing an enhanced temporal candidate list based on the coordinate information of the initial matching CU; determining coordinate information of a
(Continued)

target matching CU according to the ETMVP mode index value; and determining motion information of a subblock at a corresponding position in the current CU according to the motion information of the target matching CU.

15 Claims, 5 Drawing Sheets

(51) Int. Cl.
  *H04N 19/13* (2014.01)
  *H04N 19/139* (2014.01)
  *H04N 19/147* (2014.01)
  *H04N 19/159* (2014.01)
  *H04N 19/172* (2014.01)
  *H04N 19/176* (2014.01)
  *H04N 19/52* (2014.01)
  *H04N 19/70* (2014.01)

(52) U.S. Cl.
  CPC ......... *H04N 19/147* (2014.11); *H04N 19/159* (2014.11); *H04N 19/172* (2014.11); *H04N 19/176* (2014.11); *H04N 19/70* (2014.11)

(58) Field of Classification Search
  USPC ........................................ 375/240.01–240.29
  See application file for complete search history.

(56) References Cited

U.S. PATENT DOCUMENTS

| | | | | |
|---|---|---|---|---|
| 2016/0050430 | A1* | 2/2016 | Xiu | H04N 19/513 |
| | | | | 375/240.16 |
| 2020/0021812 | A1 | 1/2020 | Xu et al. | |
| 2021/0105463 | A1 | 4/2021 | Zhang et al. | |
| 2021/0105482 | A1 | 4/2021 | Zhang et al. | |
| 2022/0078441 | A1 | 3/2022 | Chen et al. | |
| 2022/0272323 | A1* | 8/2022 | Li | H04N 19/136 |
| 2022/0279196 | A1* | 9/2022 | Xu | H04N 19/44 |

FOREIGN PATENT DOCUMENTS

| | | |
|---|---|---|
| CN | 110662075 | 1/2020 |
| CN | 110719488 | 1/2020 |
| CN | 110933426 | 3/2020 |
| CN | 111264061 | 6/2020 |
| CN | 111385575 | 7/2020 |
| CN | 111602399 | 8/2020 |
| CN | 111953995 | 11/2020 |
| CN | 111953997 | 11/2020 |
| CN | 112004097 | 11/2020 |
| CN | 112153389 | 12/2020 |
| CN | 112204983 | 1/2021 |
| CN | 112218076 | 1/2021 |
| CN | 112243586 | 1/2021 |
| CN | 112291565 | 1/2021 |
| CN | 112422971 | 2/2021 |
| CN | 113794888 | 12/2021 |
| EP | 3050296 | 3/2019 |
| EP | 3955576 | 2/2022 |
| TW | 2019-31857 | 8/2019 |
| TW | 2019-33866 | 8/2019 |
| WO | WO 2020003259 | 1/2020 |
| WO | WO 2020232845 | 11/2020 |

OTHER PUBLICATIONS

Office Action in Australian Appln. No. 2022235881, mailed on Jan. 12, 2024, 6 pages.
Office Action in Korean Appln. No. 10-2023-7028128, mailed on Nov. 23, 2023, 8 pages (with English translation).
International Search Report in International Appln. No. PCT/CN2022/080697, mailed on Jun. 7, 2022, 6 pages (with English translation).
Notice of Allowance in Chinese Appln. No. 202110297136.3, dated Nov. 30, 2022, 7 pages (with English translation).
Notice of Allowance in Chinese Appln. No. 202111143912.0, dated Nov. 30, 2022, 7 pages (with English translation).
Notice of Allowance in Chinese Appln. No. 202111146263.X, dated Nov. 30, 2022, 7 pages (with English translation).
International Preliminary Report on Patentability in International Appln. No. PCT/CN2022/080697, mailed on Sep. 28, 2023, 12 pages (With English translation).
Chen et al., "Algorithm description for Versatile Video Coding and Test Model 11 (VTM 11)," Joint Video Experts Team (JVET) of ITU-T SG 16 WP 3 and ISO/IEC JTC 1/SC 29, JVET-T2002-v2, 20th Meeting, by teleconference, Oct. 7-16, 2020, 102 pages.
Search Report and Written Opinion in Singaporean Appln. No. 11202306293W, mailed on May 28, 2024, 7 pages.

* cited by examiner

METHODS, APPARATUSES, DEVICES, AND STORAGE MEDIA FOR ENCODING OR DECODING

CROSS-REFERENCE TO RELATED APPLICATIONS

This application is a national stage of International Application No. PCT/CN2022/080697, filed on Mar. 14, 2022, which claims priority to Chinese Patent Application No. 202110297136.3, filed on Mar. 19, 2021. Both of the aforementioned applications are hereby incorporated by reference in their entireties.

TECHNICAL FIELD

The present application relates to video encoding and decoding technology, and in particular, to methods, apparatuses, devices and storage media for encoding or decoding.

BACKGROUND

A whole process of video encoding generally includes prediction, transformation, quantization, entropy coding, filtering and other operations. Prediction can be divided into two types: intra prediction and inter prediction. Intra prediction applies surrounding encoded units as a reference to predict the current uncoded units, effectively removing the redundancy in spatial domain. Inter prediction applies neighboring encoded units as a reference to predict the current uncoded units, effectively removing the redundancy in temporal domain.

The Alternative Temporal Motion Vector Prediction (ATMVP) technique adopted in the Versatile Video Coding (VVC) standard takes the motion information of the temporal subblock as the basis and provides different motion information for each subblock in the current coding unit (CU).

SUMMARY

In view of this, the present application provides methods, apparatuses, devices and storage media for encoding and decoding.

A decoding method is provided by the first aspect of embodiments of the present application, which includes: obtaining a value of an Enhanced Temporal Motion Vector Prediction (ETMVP) mode flag and an ETMVP mode index value for a current coding unit (CU); when the value of the ETMVP mode flag is a first value: determining coordinate information of an initial matching CU of the current CU according to coordinate information of the current CU; constructing an enhanced temporal candidate list based on the coordinate information of the initial matching CU; obtaining a corresponding ETMVP mode number from the enhanced temporal candidate list according to the ETMVP mode index value, and determining coordinate information of a target matching CU corresponding to the ETMVP mode number; determining motion information of the target matching CU according to the coordinate information of the target matching CU, wherein the motion information of the target matching CU comprises motion information of each subblock in the target matching CU, and determining motion information of a subblock at a corresponding position in the current CU according to the motion information of each subblock in the target matching CU.

In an embodiment, obtaining the value of the ETMVP mode flag for the current CU, comprises: when the current CU satisfies a first parsing condition, parsing the value of the ETMVP mode flag from a bitstream; otherwise, determining the value of the ETMVP mode flag as a second value; wherein, if the value of the ETMVP mode flag is the first value, it indicates that the current CU enables an ETMVP mode; if the value of the ETMVP mode flag is the second value, it indicates that the current CU disables the ETMVP mode.

In an embodiment, the current CU satisfies the first parsing condition, comprises one or more of: a prediction mode of the current CU is skip mode or direct mode; the current CU has a size satisfying the preset size limit; according to sequence-level high-level syntax, the current CU enables ETMVP techniques; the current CU satisfies a condition for using Angular Weighted Prediction (AWP) or a condition for using Ultimate Motion Vector Expression (UMVE).

In an embodiment, the preset size limit comprises: the current CU has a width and a height which both are greater than or equal to N0.

In an embodiment, the N0 is 8.

In an embodiment, the current CU satisfies the condition for using AWP, comprising: according to the sequence-level high-level syntax, the current CU enables AWP techniques; the current CU has a width and a height which both are greater than or equal to N1 while less than or equal to N2; a current picture frame type is B picture; the current CU satisfies the condition for using UMVE, comprising: according to the sequence-level high-level syntax, the current CU enables UMVE techniques.

In an embodiment, the ETMVP mode flag is encoded by Context-based Adaptive Binary Arithmetic Coding (CABAC) with a context model.

In an embodiment, obtaining the ETMVP mode index value for the current CU, comprises: when the current CU satisfies a second parsing condition, parsing the ETMVP mode index value from a bitstream.

In an embodiment, the current CU satisfies the second parsing condition, comprises one or more of: a prediction mode of the current CU is skip mode or direct mode; the current CU enables the ETMVP mode.

In an embodiment, an inverse binarization of the ETMVP mode index value is realized based on a Truncated Unary with a maximum value of 4, wherein the Truncated Unary uses a bin string of up to 4 bins and each of the bins adopts a separate context model, so there are four context models in total.

In an embodiment, determining coordinate information of an initial matching CU of the current CU according to coordinate information of the current CU, comprises: determining a temporal reference picture where the matching CU is located according to the current picture frame type; determining the coordinate information of the initial matching CU in the temporal reference picture according to the coordinate information of the current CU; wherein if the current picture frame type is P picture, the temporal reference picture is in the reference picture list 0, and its reference frame index value is 0; if the current picture frame type is B picture, the temporal reference picture is in the reference picture list 1, and its reference frame index value is 0; wherein constructing an enhanced temporal candidate list according to the coordinate information of the initial matching CU, comprises: constructing the enhanced temporal candidate list according to the coordinate information of the initial matching CU in the temporal reference picture.

In an embodiment, determining the coordinate information of the initial matching CU in the temporal reference picture according to the coordinate information of the current CU, comprises: determining the coordinate information of the initial matching CU according to the upper-left corner coordinate of the current LCU, the LCU size, the current picture size, the current CU size, and the upper-left corner coordinate of the current CU in the picture.

In an embodiment, determining the coordinate information of the initial matching CU according to the upper-left corner coordinate of the current LCU, the LCU size, the current picture size, the current CU size, and the upper-left corner coordinate of the current CU in the picture, comprises: determining the initial matching CU's abscissa according to the current LCU's upper-left corner abscissa in the picture, the LCU size, the width of the current CU, the width of the current picture, and the current CU's upper-left corner abscissa in the picture; determining the initial matching CU's ordinate according to the current LCU's upper-left corner ordinate in the picture, the LCU size, the height of the current CU, the height of the current picture, and the current CU's upper-left corner ordinate in the picture.

In an embodiment, constructing an enhanced temporal candidate list based on the coordinate information of the initial matching CU, comprises: determining at least one ETMVP mode number according to the coordinate information of the initial matching CU; constructing an enhanced temporal candidate list, according to the at least one ETMVP mode number.

In an embodiment, the coordinate information of the matching CU is the upper-left corner coordinate of the matching CU in the temporal reference picture; constructing an enhanced temporal candidate list, according to the at least one ETMVP mode number, comprises: adding the ETMVP mode number 0 to the enhanced temporal candidate list, and increasing the length of the enhanced temporal candidate list by 1; if My+8 is less than or equal to the smaller values of y_ctb_pos+lcu_size−cu_height and vertical_size−cu_height, and the motion information of position A1 is different from the motion information of position C3 or the motion information of position A2 is different from the motion information of position C4, then adding the ETMVP mode number 1 to the enhanced temporal candidate list, and increasing the length of the enhanced temporal candidate list by 1; if Mx+8 is less than or equal to the smaller values of x_ctb_pos+lcu_size−cu_width and horizontal_size−cu_width, and the motion information of position A1 is different from the motion information of position B2 or the motion information of position A3 is different from the motion information of position B4, then adding the ETMVP mode number 2 to the enhanced temporal candidate list, and increasing the length of the enhanced temporal candidate list by 1; if My−8 is greater than or equal to y_ctb_pos, and the motion information of position A3 is different from the motion information of position C1 or the motion information of position A4 is different from the motion information of position C2, then adding the ETMVP mode number 3 to the enhanced temporal candidate list and increasing the length of the enhanced temporal candidate list by 1; if Mx−8 is greater than or equal to x_ctb_pos, and the motion information of position A2 is different from the motion information of position B1 or the motion information of position A4 is different from the motion information of position B3, then adding the ETMVP mode number 4 to the enhanced temporal candidate list and increasing the length of the enhanced temporal candidate list by 1; wherein (Mx, My) is the coordinate information of the initial matching CU, (x_ctb_pos, y_ctb_pos) is the upper-left corner coordinate of the current LCU in the picture, lcu_size is the size of the LCU, the cu_width and cu_height are the width and height of the current CU, and the horizontal_size and vertical_size are the width and height of the current picture, respectively; A1 is the 4*4 block in the upper-left corner of the initial matching CU, B1 is the 4*4 block directly to the left of A1, and C1 is the 4*4 block directly above A1; A2 is the 4*4 block in the upper-right corner of the initial matching CU, B2 is the 4*4 block directly to the right of A2, and C2 is the 4*4 block directly above A2; A3 is the 4*4 block in the lower-left corner of the initial matching CU, B3 is the 4*4 block directly to the left of A3, and C3 is the 4*4 block directly below A3; A4 is the 4*4 block in the lower-right corner of the initial matching CU, B4 is the 4*4 block directly to the right of A4, and C4 is the 4*4 block directly below A4.

In an embodiment, constructing an enhanced temporal candidate list based on the coordinate information of the initial matching CU, also comprises: when the length of the enhanced temporal candidate list is less than 5, performing the following operations in a loop until the length of the enhanced temporal candidate list equals to 5: adding another number in the enhanced temporal candidate list that is the same as the last ETMVP mode number in the list, and increasing the length of the enhanced temporal candidate list by 1.

In an embodiment, obtaining a corresponding ETMVP mode number from the enhanced temporal candidate list according to the ETMVP mode index value, and determining coordinate information of a target matching CU corresponding to the ETMVP mode number, comprises: if the ETMVP mode number is 0, then Px equals Mx, Py equals My; if the ETMVP mode number is 1, then Px equals Mx, Py equals My+n; if the ETMVP mode number is 2, then Px equals Mx+n, Py equals My; if the ETMVP mode number is 3, then Px equals Mx, Py equals My−n; if the ETMVP mode number is 4, then Px equals Mx−n, Py equals My; wherein (Mx,My) is the upper-left corner coordinate of the initial matching CU, and (Px,Py) is the upper-left corner coordinate of the target matching CU.

In an embodiment, n is 8.

In an embodiment, determining motion information of a subblock at a corresponding position in the current CU according to the motion information of each subblock in the target matching CU, comprises: for any subblock in the target matching CU: when the current picture frame type is P picture: if the forward motion information of the subblock is available, then the forward motion information of the subblock is scaled to the first frame of List0, and the scaled forward motion information is given to the subblock at the corresponding position in the current CU.

In an embodiment, determining motion information of a subblock at a corresponding position in the current CU according to the motion information of each subblock in the target matching CU, comprises: for any subblock in the target matching CU: when the current picture frame type is B picture: if the forward motion information and backward motion information of the subblock are available, the forward motion information and backward motion information of the subblock are scaled respectively, pointing to the first frame of List0 and the first frame of List1, and the scaled forward motion information and backward motion information are respectively given to the subblock at the corresponding position in the current CU; if the forward motion information of the subblock is available, but the backward motion information is unavailable, the forward motion information of the subblock is scaled pointing to the first frame of List0, and the scaled forward motion information is given to the subblock at the corresponding position in the current CU; if the backward motion information of the subblock is available, but the forward motion information is unavailable, the backward motion information of the subblock is scaled pointing to the first frame of List1, and the scaled backward motion information is given to the subblock at the corresponding position in the current CU.

In an embodiment, determining the motion information of the subblock at the corresponding position in the current CU according to the motion information of each subblock in the target matching CU, comprises: for any subblock in the target matching CU: when the current picture frame type is P picture: If the forward motion information of the subblock is unavailable, when the forward motion information of the first surrounding block of the current CU is available, the forward motion information of the first surrounding block is scaled to the first frame of List0, and the scaled forward motion information is given to the subblock at the corresponding position in the current CU; when the forward motion information of the first surrounding block is unavailable, the zero motion information is given to the subblock at the corresponding position in the current CU; when the current picture frame type is B picture: if neither the forward motion information nor backward motion information of the subblock is available, when both the forward motion information and backward motion information of the first surrounding block of the current CU are available, the forward motion information and backward motion information of the first surrounding block are scaled to the first frame of List0 and the first frame of List1 respectively, and the scaled forward motion information and scaled backward motion information are given to the subblock at the corresponding position in the current CU respectively; when the forward motion information of the first surrounding block is available, but its backward motion information is unavailable, its forward motion information is scaled to the first frame of List0, and the scaled forward motion information is given to the subblock at the corresponding position in the current CU; when the backward motion information of the first surrounding block is available, but its forward motion information is unavailable, its backward motion information is scaled to the first frame of List1, and the scaled backward motion information is given to the subblock at the corresponding position in the current CU; when neither the forward motion information nor the backward motion information of the first surrounding block is available, the zero motion information is given to the subblock at the corresponding position in the current CU; wherein the first surrounding block comprises any decoded neighboring block of the current CU.

In an embodiment, according to the motion information of each subblock in the target matching CU determining the motion information of the subblock at the corresponding position in the current CU, also comprises: performing motion compensation (MC) on the corresponding subblock in the current CU according to the motion information of each subblock in the current CU.

In an embodiment, performing MC on the corresponding subblock in the current CU according to the motion information of each subblock in the current CU, comprises: for any subblock of the current CU, Decoder-side Motion Vector Refinement (DMVR) is not used for its motion information; if the subblock satisfies the application conditions of BI-directional Optical flow (BIO), MC is performed on the subblock according to the motion information of the subblock, and BIO techniques are used to add the optical flow offset value to the compensated pixel value, then the prediction sample matrix of the subblock is obtained; otherwise, performing MC on the subblock according to the motion information of the subblock, and obtaining the prediction sample matrix of the subblock; wherein the prediction samples of the current CU are composed of prediction samples of each subblock.

In an embodiment, the subblock satisfies the application conditions of BI-directional Optical flow (BIO), at least comprises: according to sequence-level high-level syntax, BIO techniques is enabled; the MV accuracy of the current CU equals 0; the subblock uses bi-prediction; for this subblock, the reference frame whose index value is refIdxL0 in the reference picture list 0 and the reference frame whose index value is refIdxL1 in the reference picture list 1 are respectively displayed on both sides of the current frame.

In an embodiment, BIO techniques are used to add the optical flow offset value to the compensated pixel value, then the prediction sample matrix of the subblock is obtained, comprises: determining the prediction sample matrix of the subblock according to the forward MC value, backward MC value, and optical flow offset value of the subblock.

An encoding method is provided by the second aspect of embodiments of the present application, which includes: determining coordinate information of an initial matching CU of a current CU according to coordinate information of the current CU; constructing an enhanced temporal candidate list based on the coordinate information of the initial matching CU; determining coordinate information of a target matching CU corresponding to each ETMVP mode number in the enhanced temporal candidate list by going through ETMVP mode numbers in the enhanced temporal candidate list sequentially; determining motion information of the target matching CU according to the coordinate information of the target matching CU, wherein the motion information of the target matching CU comprises motion information of each subblock in the target matching CU, and determining motion information of a subblock at a corresponding position in the current CU according to the motion information of each subblock in the target matching CU; performing motion compensation (MC) on each subblock in the current CU according to the motion information of the subblock in the current CU; calculating a rate-distortion cost of each ETMVP mode, and comparing the rate-distortion cost with respective rate-distortion costs of other prediction modes to select a prediction mode corresponding to a smallest rate-distortion cost; and recording an ETMVP mode flag and an ETMVP mode index value of the selected prediction modes into a bitstream to be transmitted to a decoding device.

In an embodiment, according to the motion information of each subblock in the current CU performing MC on the corresponding subblock in the current CU, comprises: for any subblock of the current CU, Decoder-side Motion Vector Refinement (DMVR) is not used for its motion information; if the subblock satisfies the application conditions of BI-directional Optical flow (BIO), MC is performed on the subblock according to the motion information of the subblock, and BIO techniques are used to add the optical flow offset value to the compensated pixel value, then the prediction sample matrix of the subblock is obtained; otherwise, performing MC on the subblock according to the motion information of the subblock, and obtaining the prediction sample matrix of the subblock. wherein the prediction samples of the CU unit are composed of prediction samples of each subblock.

In an embodiment, the subblock satisfies the application conditions of BI-directional Optical flow (BIO), at least comprises: according to sequence-level high-level syntax, BIO techniques is enabled; the MV accuracy of the current CU equals 0; the subblock uses bi-prediction; for this subblock, the reference frame whose index value is refIdxL0 in the reference picture list 0 and the reference frame whose index value is refIdxL1 in the reference picture list 1 are respectively displayed on both sides of the current frame.

In an embodiment, BIO techniques are used to add the optical flow offset value to the compensated pixel value, then the prediction sample matrix of the subblock is obtained, comprises: if the value of the ETMVP mode flag is the first value, it indicates that the current CU enables the ETMVP mode; if he value of the ETMVP mode flag is the second value, it indicates that the current CU disables the ETMVP mode.

In an embodiment, writing the corresponding ETMVP mode flag into the bitstream, comprises: when the current CU satisfies a first parsing condition, writing the corresponding ETMVP mode flag into the bitstream; otherwise, determining the value of the ETMVP mode flag as the second value; if the value of the ETMVP mode flag is the first value, it indicates that the current CU enables the ETMVP mode; if he value of the ETMVP mode flag is the second value, it indicates that the current CU disables the ETMVP mode.

In an embodiment, the current CU satisfies the first parsing condition, comprises: a prediction mode of the current CU is skip mode or direct mode; the current CU has a width and a height which both are greater than or equal to 8; according to sequence-level high-level syntax, the current CU enables ETMVP techniques; the current CU satisfies a condition for using Angular Weighted Prediction (AWP) or a condition for using Ultimate Motion Vector Expression (UMVE).

In an embodiment, the current CU satisfies a condition for using AWP, comprises: according to the sequence-level high-level syntax, the current CU enables AWP techniques; the current CU has a width and a height which both are greater than or equal to N1 while less than or equal to N2; a current picture frame type is B picture; the current CU satisfies the condition for using UMVE, comprising: according to the sequence-level high-level syntax, the current CU enables UMVE techniques.

In an embodiment, the ETMVP mode flag is encoded by Context-based Adaptive Binary Arithmetic Coding (CABAC) with a context model.

In an embodiment, writing the ETMVP mode index value into the bitstream, comprises: when the current CU satisfies a second parsing condition, writing the ETMVP mode index value into the bitstream.

In an embodiment, the current CU satisfies the second parsing condition, comprises one or more of: a prediction mode of the current CU is skip mode or direct mode; the current CU enables the ETMVP mode.

In an embodiment, an inverse binarization of the ETMVP mode index value is realized based on a Truncated Unary with a maximum value of 4, wherein the Truncated Unary uses a bin string of up to 4 bins and each of the bins adopts a separate context model, so there are four context models in total.

In an embodiment, determining coordinate information of an initial matching CU of the current CU according to coordinate information of the current CU, comprises: determining a temporal reference picture where the matching CU is located according to the current picture frame type; determining the coordinate information of the initial matching CU in the temporal reference picture according to the coordinate information of the current CU; wherein if the current picture frame type is P picture, the temporal reference picture is in the reference picture list 0, and its reference frame index value is 0; if the current picture frame type is B picture, the temporal reference picture is in the reference picture list 1, and its reference frame index value is 0; wherein constructing an enhanced temporal candidate list according to the coordinate information of the initial matching CU, comprises: constructing the enhanced temporal candidate list according to the coordinate information of the initial matching CU in the temporal reference picture.

In an embodiment, determining the coordinate information of the initial matching CU in the temporal reference picture according to the coordinate information of the current CU, comprises: determining the coordinate information of the initial matching CU according to the upper-left corner coordinate of the current LCU, the LCU size, the current picture size, the current CU size, and the upper-left corner coordinate of the current CU in the picture.

In an embodiment, determining the coordinate information of the initial matching CU according to the upper-left corner coordinate of the current LCU, the LCU size, the current picture size, the current CU size, and the upper-left corner coordinate of the current CU in the picture, comprises: determining the initial matching CU's abscissa according to the current LCU's upper-left corner abscissa in the picture, the LCU size, the width of the current CU, the width of the current picture, and the current CU's upper-left corner abscissa in the picture; determining the initial matching CU's ordinate according to the current LCU's upper-left corner ordinate in the picture, the LCU size, the height of the current CU, the height of the current picture, and the current CU's upper-left corner ordinate in the picture.

In an embodiment, determining coordinate information of a target matching CU corresponding to each ETMVP mode number in the enhanced temporal candidate list by going through ETMVP mode numbers in the enhanced temporal candidate list sequentially comprises: if the ETMVP mode number is 0, then Px equals Mx, Py equals My; if the ETMVP mode number is 1, then Px equals Mx, Py equals My+8; if the ETMVP mode number is 2, then Px equals Mx+8, Py equals My; if the ETMVP mode number is 3, then Px equals Mx, Py equals My−8; if the ETMVP mode number is 4, then Px equals Mx−8, Py equals My; wherein (Mx,My) is the upper-left corner coordinate of the initial matching CU, and (Px,Py) is the upper-left corner coordinate of the target matching CU.

In an embodiment, constructing an enhanced temporal candidate list based on the coordinate information of the initial matching CU, comprises: determining at least one ETMVP mode number according to the coordinate information of the initial matching CU; constructing an enhanced temporal candidate list, according to the at least one ETMVP mode number.

In an embodiment, the coordinate information of the matching CU is the upper-left corner coordinate of the matching CU in the temporal reference picture; constructing an enhanced temporal candidate list, according to the at least one ETMVP mode number, comprises: adding the ETMVP mode number 0 to the enhanced temporal candidate list, and increasing the length of the enhanced temporal candidate list by 1; if My+8 is less than or equal to the smaller values of y_ctb_pos+lcu_size−cu_height and vertical_size− cu_height, and the motion information of position A1 is different from the motion information of position C3 or the motion information of position A2 is different from the motion information of position C4, then adding the ETMVP mode number1 to the enhanced temporal candidate list, increasing the length of the enhanced temporal candidate list by 1; if Mx+8 is less than or equal to the smaller values of x_ctb_pos+lcu_size−cu_width and horizontal_size−cu_width, and the motion information of position A1 is different from the motion information of position B2 or the motion information of position A3 is different from the motion information of position B4, then adding the ETMVP mode number 2 to the enhanced temporal candidate list and increasing the length of the enhanced temporal candidate list by 1; if My−8 is greater than or equal to y_ctb_pos, and the motion information of position A3 is different from the motion information of position C1 or the motion information of position A4 is different from the motion information of position C2, then adding the ETMVP mode number 3 to the enhanced temporal candidate list and increasing the length of the enhanced temporal candidate list by 1; If Mx−8 is greater than or equal to x_ctb_pos, and the motion information of position A2 is different from the motion information of position B1 or the motion information of position A4 is different from the motion information of position B3, then adding the ETMVP mode number 4 to the enhanced temporal candidate list and increasing the length of the enhanced temporal candidate list by 1; wherein (Mx, My) is the coordinate information of the initial matching CU, (x_ctb_pos, y_ctb_pos) is the upper-left corner coordinate of the current LCU in the picture, lcu_size is the size of the LCU, the cu_width and cu_height are the width and height of the current CU respectively, and the horizontal_size and vertical_size are the width and height of the current picture respectively; A1 is the 4*4 block in the upper-left corner of the initial matching CU, B1 is the 4*4 block directly to the left of A1, and C1 is the 4*4 block directly above A1; A2 is the 4*4 block in the upper-right corner of the initial matching CU, B2 is the 4*4 block directly to the right of A2, and C2 is the 4*4 block directly above A2; A3 is the 4*4 block in the lower-left corner of the initial matching CU, B3 is the 4*4 block directly to the left of A3, and C3 is the 4*4 block directly below A3; A4 is the 4*4 block in the lower-right corner of the initial matching CU, B4 is the 4*4 block directly to the right of A4, and C4 is the 4*4 block directly below A4.

In an embodiment, constructing an enhanced temporal candidate list based on the coordinate information of the initial matching CU, also comprises: when the length of the enhanced temporal candidate list is less than 5, performing the following operations in a loop until the length of the enhanced temporal candidate list equals to 5: adding another number in the enhanced temporal candidate list that is the same as the last ETMVP mode number in the list, and increasing the length of the enhanced temporal candidate list by 1.

In an embodiment, determining motion information of a subblock at a corresponding position in the current CU according to the motion information of each subblock in the target matching CU, comprises: for any subblock in the target matching CU: when the current picture frame type is P picture: if the forward motion information of the subblock is available, then the forward motion information of the subblock is scaled to the first frame of List0, and the scaled forward motion information is given to the subblock at the corresponding position in the current CU.

In an embodiment, determining motion information of a subblock at a corresponding position in the current CU according to the motion information of each subblock in the target matching CU, comprises: for any subblock in the target matching CU: when the current picture frame type is B picture: if the forward motion information and backward motion information of the subblock are available, the forward motion information and backward motion information of the subblock are scaled respectively to the first frame of List0 and the first frame of List1, and the scaled forward motion information and backward motion information are respectively given to the subblock at the corresponding position in the current CU; if the forward motion information of the subblock is available, but the backward motion information is unavailable, the forward motion information of the subblock is scaled pointing to the first frame of List0, and the scaled forward motion information is given to the subblock at the corresponding position in the current CU; if the backward motion information of the subblock is available, but the forward motion information is unavailable, the backward motion information of the subblock is scaled to the first frame of List1, and the scaled backward motion information is given to the subblock at the corresponding position in the current CU.

In an embodiment, determining motion information of a subblock at a corresponding position in the current CU according to the motion information of each subblock in the target matching CU, comprises: for any subblock in the target matching CU: when the current picture frame type is P picture: if the forward motion information of the subblock is unavailable, when the forward motion information of the first surrounding block of the current CU is available, the forward motion information of the first surrounding block is scaled to the first frame of List0, and the scaled forward motion information is given to the subblock at the corresponding position in the current CU; when the forward motion information of the first surrounding block is unavailable, the zero motion information is given to the subblock at the corresponding position in the current CU; when the current picture frame type is B picture: if neither the forward motion information nor backward motion information of the subblock is available, when both the forward motion information and backward motion information of the first surrounding block of the current CU are available, the forward motion information and backward motion information of the first surrounding block are scaled to the first frame of List0 and the first frame of List1 respectively, and the scaled forward motion information and scaled backward motion information are given to the subblock at the corresponding position in the current CU respectively; when the forward motion information of the first surrounding block is available, but its backward motion information is unavailable, its forward motion information is scaled to the first frame of List0, and the scaled forward motion information is given to the subblock at the corresponding position in the current CU; when the backward motion information of the first surrounding block is available, but its forward motion information is unavailable, its backward motion information is scaled to the first frame of List1, and the scaled backward motion information is given to the subblock at the corresponding position in the current CU; when neither the forward motion information nor the backward motion information of the first surrounding block is available, the zero motion information is given to the subblock at the corresponding position in the current CU; wherein the first surrounding block comprises any decoded neighboring block of the current CU.

A decoding apparatus is provided by the third aspect of embodiments of the present application, which includes: an acquisition unit, configured to obtain a value of an ETMVP mode flag and an ETMVP mode index value for a current CU; a first determining unit, configured to determine coordinate information of an initial matching CU of the current CU according to coordinate information of the current CU when the value of the ETMVP mode flag is a first value; a constructing unit, configured to construct an enhanced temporal candidate list based on the coordinate information of the initial matching CU; a second determining unit, configured to obtain a corresponding ETMVP mode number from the enhanced temporal candidate list according to the ETMVP mode index value, and determine coordinate information of a target matching CU corresponding to the ETMVP mode number; a third determining unit, configured to determine motion information of the target matching CU according to the coordinate information of the target matching CU, wherein the motion information of the target matching CU comprises motion information of each sub-block in the target matching CU, and determine motion information of a subblock at a corresponding position in the current CU according to the motion information of each subblock in the target matching CU.

An encoding apparatus is provided by the fourth aspect of embodiments of the present application, which includes: a first determining unit, configured to determine coordinate information of an initial matching CU of a current CU according to coordinate information of the current CU; a constructing unit, configured to construct an enhanced temporal candidate list based on the coordinate information of the initial matching CU; a second determining unit, configured to determine coordinate information of a target matching CU corresponding to each enhanced temporal candidate mode in the enhanced temporal candidate list by going through ETMVP mode numbers in the enhanced temporal candidate list sequentially; a third determining unit, configured to determine motion information of the target matching CU according to the coordinate information of the target matching CU, wherein the motion information of the target matching CU comprises motion information of each sub-block in the target matching CU, and determine motion information of a subblock at a corresponding position in the current CU according to the motion information of each subblock in the target matching CU; a MC unit, configured to perform MC on each subblock in the current CU according to the motion information of the subblock in the current CU; an encoding unit, configured to calculate a rate-distortion cost corresponding to each ETMVP mode, compare the rate-distortion cost with respective rate-distortion costs of other prediction modes, selecte a prediction mode corresponding to a smallest rate-distortion cost, and then record an ETMVP mode flag and an ETMVP mode index value of the selected ETMVP mode into a bitstream to be transmitted to a decoding device.

A decoding device is provided by the fifth aspect of embodiments of the present application, which includes a processor and a machine-readable storage medium, wherein the machine-readable storage medium stores machine-executable instructions that can be executed by the processor, and the processor is configured to execute the machine-executable instructions to implement the decoding method in the first aspect.

An encoding device is provided by the sixth aspect of embodiments of the present application, which includes a processor and a machine-readable storage medium, wherein the machine-readable storage medium stores machine-executable instructions that can be executed by the processor, and the processor is configured to execute the machine-executable instructions to implement the decoding method in the second aspect.

A machine-readable storage medium is provided by the seventh aspect of embodiments of the present application, wherein the machine-readable storage medium stores machine-executable instructions, and the machine-executable instructions are executed by the processor to implement the method described in the first aspect or the second aspect.

The decoding method provided by the embodiments of the present application comprises: obtaining a value of an ETMVP mode flag and an ETMVP mode index value for a current CU; when the value of the ETMVP mode flag is a first value, determining coordinate information of an initial matching CU of the current CU according to coordinate information of the current CU, and constructing an enhanced temporal candidate list based on the coordinate information of the initial matching CU; obtaining a corresponding ETMVP mode number from the enhanced temporal candidate list according to the ETMVP mode index value, and determining coordinate information of a target matching CU corresponding to the ETMVP mode number; determining motion information of the target matching CU according to the coordinate information of the target matching CU, wherein the motion information of the target matching CU comprises motion information of each subblock in the target matching CU, and determining motion information of a subblock at a corresponding position in the current CU according to the motion information of each subblock in the target matching CU, which thereby improves encoding and decoding performance.

DETAILED DESCRIPTION OF EMBODIMENTS

Figure 1:
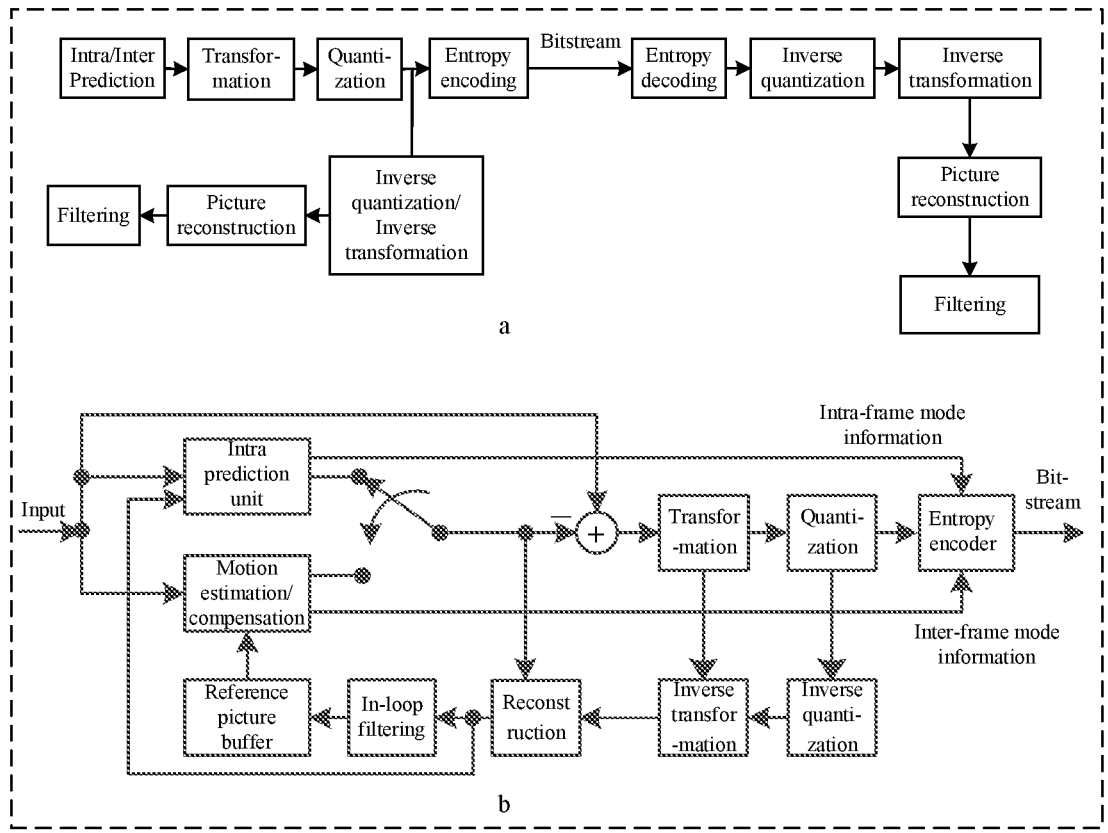
FIG. 1 is a diagram of a method of encoding and decoding according to an embodiment of the present application.

Embodiments will be described in detail here, examples of which are illustrated in the accompanying drawings. When the following description relates to the accompanying drawings, unless specified otherwise, the same numerals in different drawings represent the same or similar elements. The implementations described in the following embodiments do not represent all implementations consistent with the present application. Rather, they are merely examples of apparatuses and methods consistent with some aspects of the present application as detailed in the appended claims.

The terms used in the present application are merely for the purpose of describing specific embodiments and are not intended to limit the present application. The terms "a", "said" and "the" of singular forms used in the present application and the appended claims are also intended to include plural forms, unless the context clearly indicates otherwise.

To enable those skilled in the art to better understand the technical solutions provided by the embodiments of the present application, the following first briefly describes some technical terms and the existing main processes of video encoding and decoding involved in the embodiments of the present application.

To enable those skilled in the art to better understand the technical solutions provided by the embodiments of the present application, the following first briefly describes some technical terms involved in the embodiments of the present application.

Technical Terms

1. Prediction Signal: referring to the pixel value determined from the encoded and decoded pixels. A residual is obtained by the difference between the original and the prediction signal, then the residual is transformed and quantized, and a coefficient is encoded.

For example, inter prediction signal refers to the pixel values of the current picture block determined from the reference frame (reconstructed pixel frame). Since the pixel positions are discrete, interpolation is needed to obtain the final prediction signal. The closer the prediction signal is to the original signal, the smaller the residual energy obtained by subtracting the two, and the higher the encoding and compression performance.

2. Motion Vector (MV): In inter-frame coding (inter coding), MV refers to the relative displacement between the current coding unit (CU) and the best matching CU in its reference picture. Each partition block (may also be named as "subblock") has a corresponding MV that needs to be transmitted to a decoder. If MV for each subblock is encoded and transmitted independently, especially if the subblock is divided into small sizes, it consumes a considerable amount of bits. In order to reduce the number of bits used to encode MV, the spatial correlation between neighboring picture blocks is utilized in video encoding to predict the MV of the current unencoded block according to the MV of neighboring encoded blocks, and then the prediction difference is encoded. In this way, it can effectively reduce the number of bits for representing MVs. Wherein, during a MV encoding process of the current picture block, the MV of the neighboring encoded block is utilized to predict the MV of the current picture block, then the difference between the predicted value of the MV (also named as "Motion Vector Prediction" or further brieflied as"MVP") and the true estimate value of the MV, namely, the Motion Vector Difference (MVD) is encoded, thus effectively reducing the number of bits used to encode MV.

3. Motion Information: Since the MV represents the relative displacement between the current CU and the best matching CU in a reference picture, in order to accurately obtain the information pointing to the picture block, in addition to the MV information, it is also necessary to adopt index information of the reference picture to indicate which reference picture is used. In video encoding technology, for a current picture, usually based on certain principles a reference picture list is established, and the reference picture index information indicates which reference picture in the reference picture list is used for the current picture block. In addition, many encoding techniques support multiple reference picture lists, so another index value is needed to indicate which reference picture list is used, which may be referred to as the reference direction. In video encoding, motion-related encoding information such as MV, reference frame index, and reference direction are collectively referred to as motion information. For example, motion information is: a quintuple used for inter prediction, consisting of prediction reference mode, L0 MV, L1 MV, L0 reference index and L1 reference index.

4. Rate-Distortion Optimized (RDO): The metrics for evaluating the coding efficiency include: bitrate and Peak Signal to Noise Ratio (PSNR). The smaller the bitrate, the larger the compression ratio; the larger the PSNR, the better the reconstructed picture quality. The evaluation formula used in mode selection is essentially a comprehensive evaluation of the two. Here is the cost corresponding to a mode:

$$J(\text{mode})=D+\lambda*R.$$

Wherein, D represents Distortion, usually measured by Sum of Squares for Error (SSE) metrics, and SSE is the sum of squared error of the difference between reconstruction block and source picture block; $\lambda$ is the Lagrange multiplier; R is the actual amount of bits needed to encode picture blocks in the mode, including the sum of bits needed to encode mode information, motion information, residuals, etc.

If RDO is used in mode selection to make comparative decisions about encoding modes, usually the best encoding performance can be guaranteed.

5. BI-directional Optical flow (BIO): BIO technology adds optical flow compensation to the current CU based on the gradient information of pixel values in the forward and backward reference frames. For example, the technical details of BIO can be as follows:

5.1 The gradient sums S1, S2, S3, S5 and S6 are calculated as follows:

$$S_1 = \sum_{(i,j)\in\Omega} \psi_x(i,j)\cdot\psi_x(i,j)$$

$$S_2 = \sum_{(i,j)\in\Omega} \psi_x(i,j)\cdot\psi_y(i,j)$$

$$S_3 = \sum_{(i,j)\in\Omega} \theta(i,j)\cdot\psi_x(i,j)$$

$$S_5 = \sum_{(i,j)\in\Omega} \psi_y(i,j)\cdot\psi_y(i,j)$$

$$S_6 = \sum_{(i,j)\in\Omega} \theta(i,j)\cdot\psi_y(i,j)$$

Wherein, $\psi_x(i,j)$, $\psi_y(i,j)$ and $\theta(i,j)$ are calculated as follows:

$$\psi_x(i,j) = \frac{\partial I^{(1)}}{\partial x}(i,j) + \frac{\partial I^{(0)}}{\partial x}(i,j)$$

-continued $$\psi_y(i,j) = \frac{\partial I^{(1)}}{\partial y}(i,j) + \frac{\partial I^{(0)}}{\partial y}(i,j)$$

$$\theta(i,j) = I^{(1)}(i,j) - I^{(0)}(i,j)$$

Wherein, $I^0(x, y)$ and $I^{(1)}(x,y)$ indicate forward motion compensation (MC) value with its entended value and backward MC value with its extended value. It can be extended by copying the MC values of the block boundary or by taking them from the reference pixel position. $\psi_x(i,j)$ and $\psi_y(i,j)$ indicate the rate of change of the horizontal and vertical components for the pixel in the forward reference frame and backward reference frame. $\theta(i, j)$ refers to the pixel-value difference between the following two values: the forward MC value with its extended value, and the backward MC value with its extended value.

5.2 The motion vector refinement (MVR) $v_x$ and $v_y$ are then calculated as follows:

$$v_x = (S_1+r) > m? \text{clip3}(-th_{BIO}, th_{BIO}, (S_3<<5)/(S_1+r)): 0$$

$$v_y = (S_5+r) > m? \text{clip3}(-th_{BIO}, th_{BIO}, ((S_6<<6)-v_x S_2)/((S_5+r)<<1)): 0$$

Wherein, << is the left-shift operator, "x>y? z: a" means that when "x>y" is true, its value is z; when"x>y" is not true, its value is a; m and $th_{BIO}$ are both threshold, and r is a regular term to avoid dividing by 0. S1、S2、S3、S5 and S6 are the pixel gradient sums. Clip3 indicates that the value in it is guaranteed to be between $-th_{BIO}$ and $th_{BIO}$.

5.3 The optical flow offset value b is obtained according to the MVR.

$$b = \left(v_x\left(\frac{\partial I^{(1)}(x,y)}{\partial x} - \frac{\partial I^{(0)}(x,y)}{\partial x}\right) + v_y\left(\frac{\partial I^{(1)}(x,y)}{\partial y} - \frac{\partial I^{(0)}(x,y)}{\partial y}\right) + 32\right) >> 6$$

Wherein, (x, y) is coordinates of each pixel inside the current CU, $I^0(x, y)$ and $I^{(1)}(x, y)$ are forward MC value and backward MC value with its extended value.

5.4、Finally, based on the optical flow offset value, the predicted value of each pixel of the current CU $\text{pred}_{BIO}(x, y)$ is calculated:

$$\text{pred}_{BIO}(x,y) = (I^{(0)}(x,y) + I^{(1)}(x,y) + b + 1) >> 1$$

Wherein, $I^0(x, y)$ 和 $I^{(1)}(x, y)$ are forward MC values and backward MC values.

6. Decoder-side Motion Vector Refinement (DMVR): DMVR is applied in direct mode or skip mode.

For example, the technical details of DMVR include following operations:

6.1, obtaining the prediction block and reference pixels required for searching in the area by using the MV;

6.2, obtaining the optimal integer-pixel position;

For example, assuming that a luma picture block of the current CU is divided into non-overlapping neighboring subblocks, the initial MVs of all the subblocks are MV0 and MV1. For each subblock, centered on the positions corresponding to the initial MV0 and MV1, start searching for the position with the minimum template matching distortion within a certain close range. Template matching distortion is determined by calculating the Sum of Absolute Differences (SAD) value between a subblock centered on its corresponding position in the forward search area and a subblock centered on its corresponding position in the backward search area, and the size of the two subblocks is its width multiplied by its height.

6.3, obtaining the optimal subpixel position;

For example, based on the template matching distortion values of the optimal integer-pixel position, its left side, its right side, above it, and below it, a total of five, the secondary distortion plane near the optimal integer-pixel position is estimated, and the position with the minimum distortion in the distortion plane is determined as the subpixel position. The calculation formula is as follows:

Horizontal subpixel position=(sad_left−sad_right)*N/ ((sad_right+sad_left−2*sad_mid)*2)

Vertical subpixel position=(sad_btm−sad_top)*N/ ((sad_top+sad_btm−2*sad_mid)*2)

Wherein, sad_mid, sad_left, sad_right, sad_top and sad_btm are respectively the template matching distortion values of the optimal integer-pixel position, its left side, its right side, above it, and below it, a total of five, and N is accuracy.

6.4, calculating the final predication block based on the optimal MV.

The following is a brief description of the main existing process of video encoding and decoding.

Please refer to (a) in FIG. 1. Taking video encoding as an example, it generally includes the processes of prediction, transformation, quantization, and entropy encoding, etc. Further, the encoding process can also be implemented according to the framework of (b) in FIG. 1.

Wherein prediction can be divided into two types: intra prediction and inter prediction. Intra prediction applies surrounding encoded units as a reference to predict the current uncoded units, effectively removing the redundancy in spatial domain. Inter prediction applies neighboring encoded units as a reference to predict the current uncoded units, effectively removing the redundancy in temporal domain.

Transformation means transforming a picture from the spatial domain to the transformation domain and representing the picture by using transformation coefficients. Most pictures contain more flat areas and slowly changing areas, and appropriate transformation can transform the picture from a scattered distribution in the spatial domain to a relatively concentrated distribution in the transformation domain, remove the frequency-domain correlation between the signals, combined with the quantization process, the bitstream can be effectively compressed.

Entropy encoding is a lossless coding method that can convert a series of element symbols into a binary bitstream for transmission or storage, and the input symbols may include quantized transformation coefficients, MV information, prediction mode information, transformation quantization related syntax, etc. Entropy encoding can effectively remove redundancy from video element symbols.

Although the above takes encoding as an example, video decoding and video encoding are opposite processes, that is, video decoding usually includes entropy decoding, prediction, inverse quantization, inverse transformation, filtering, etc, and the implementation principle of each process is the same or similar to video encoding.

The following is a brief description of implementation of Alternative Temporal Motion Vector Prediction (ATMVP) technology.

The process of the existing ATMVP technology consists mainly of the following steps:

Step 1), determining the Temporal Motion Vector Prediction (TMVP). It is to determine whether the motion information at the position A0 of the current CU satisfies the following conditions.

a) Position A0 exists and is in the same Slice and unit as the current CU;

b) The prediction mode at position A0 is the inter-frame mode;

c) The reference frame index at position A0 is consistent with the reference frame index of the co-located frame of the current frame (first determine the direction L0, then determine the direction L1).

Wherein position A0 is the position of (xCb−1, yCb+CbHeight−1); (xCb, yCb) is the upper-left corner coordinate of the current CU, and CbHeight is the height of the current CU.

Figure 2:
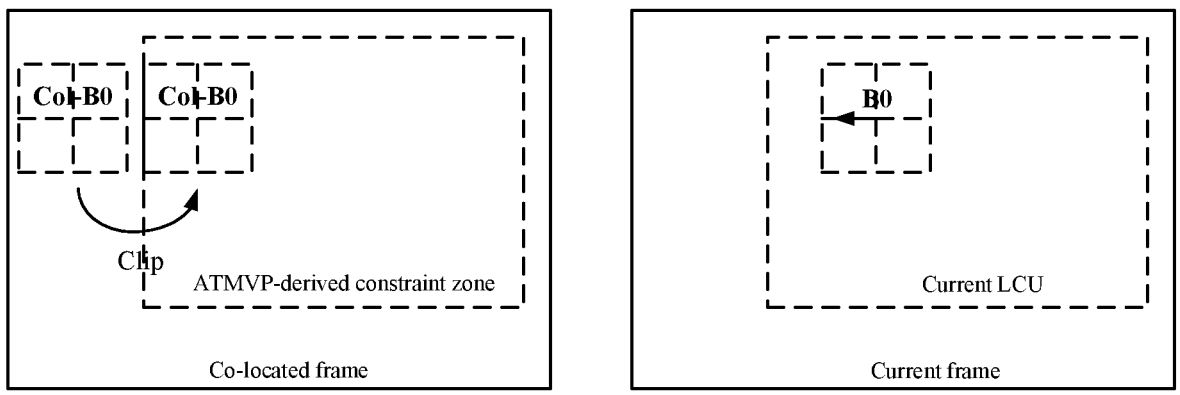
FIG. 2 is a diagram of a Clip operation according to an embodiment of the present application.

Step 2), calculating the position of a center reference block. The accuracy of determining the TMVP in Step 1) is 1/16, it is to be shifted by 4 bits to the right to be an integer pixel, while the position of the reference block needs to be clipped into the area of the co-located Largest Coding Unit (LCU) in the reference frame for the current LCU. That is, when the position of the reference block is not within the area of the co-located LCU in the reference frame for the current LCU, the reference block is to be shifted horizontally or/and vertically to just within the area of the co-located LCU in the reference frame for the current LCU, the diagram of which is shown in FIG. 2.

The position of the center reference block is calculated as follows:

$$xColCb=Clip3(xCtb\_Min(PicWidth-1,xCtb+(1<<CtbLog2Size)+3)\cdot xColCtrCb+(tempMv[0]>>4)),$$

$$yColCb=Clip3(yCtb\_Min(PicHeight-1,yCtb+(1<<CtbLog2Size)-1)\cdot yColCtrCb+(tempMv[1]>>4))$$

Wherein, (xColCb, yColCb) is the upper-left corner coordinate of the center reference block, (xCtb, yCtb) is the upper-left corner coordinate of the co-located LCU in the reference frame for the current LCU, PicWidth and PicHeight are respectively the width and height of the current frame, CtbLog2Size is the logarithm of the size of the current LCU in base 2, (xColCtrCb, yColCtrCb) is the coordinate of the center position of the current CU, tempMv[0] and tempMv[1] are respectively the horizontal MV and vertical MV of position A0.

Step 3), determining the prediction mode of the center reference block. If the prediction mode is not the inter prediction mode, then ctrPredFlagL0 and ctrPredFlagL1 are both 0; otherwise, the prediction mode is an inter prediction mode and the process goes to step 4).

Step 4), adjusting the reference position. Since the size of the subblock is 8*8, the motion information takes the 8*8 subblock as a unit, the upper-left corner coordinate of the center reference block needs to be adjusted to multiples of 8. The adjustment formula is as follows:

$$xColCb=((xColCb>>3)<<3)$$

$$yColCb=((yColCb>>3)<<3)$$

Step 5), obtaining the motion information of the adjusted center reference block. If the prediction mode of the adjusted center reference block is intra prediction or intra-frame block copy (IBC) mode, then FlagLXCol=0; otherwise, it is to determine whether the motion information in the direction L0 and direction L1 of the adjusted center reference block exists, and if so, FlagLXCol=1 and it is to obtain the motion information in the direction L0 and direction L1 of the adjusted center reference block.

For example, LX=L0 or LX=L1, when the prediction mode of the adjusted center reference block is intra prediction or IBC mode, then FlagL0Col=0 and FlagL1Col=0.

If the prediction mode of the adjusted center reference block is neither intra prediction nor IBC mode, when the motion information in the direction L0 of the adjusted center reference block exists, FlagL0Col=1; when the motion information in the direction L0 of the adjusted center reference block does not exist, FlagL0Col=0; when the motion information in the direction L1 of the adjusted center reference block exists, FlagL1Col=1; when the motion information of the direction L1 of the adjusted center reference block does not exist, FlagL1Col=0.

When FlagLXCol=1, if the long-term reference frame of the current frame is not equal to the long-term reference frame of the co-located frame, the motion information of the adjusted center reference block is determined to be unavailable, ctrPredFlagLX=0; otherwise, the motion information of the adjusted center reference block is scaled to the first frame pointing to ListX (X=0 or 1), and as the motion information of the current center reference block position, ctrPredFlagLX=1.

Step 6), when ctrPredFlagLX=1, calculating the motion information for each subblock by going through each subblock in the matching CU and for any subblock, clipping it into the area of the LCU in which the matching CU is. If the motion information of the clipped subblock is available, the motion information of the clipped subblock is scaled to the first frame pointing to ListX, and the scaled motion information is given to the subblock at the corresponding position in the current CU; if the motion information of the clipped subblock is unavailable, the motion information of the center position of the adjusted center reference block is scaled to the first frame pointing to ListX, and the scaled motion information is given to the subblock at the corresponding position in the current CU.

For example, according to the motion information of a neighboring block of the current CU, in the co-located frame, find the CU corresponding to the neighboring CU of the current CU, and then provide the motion information of each subblock in the CU at the corresponding position in the co-located frame of the CU to each subblock in the current CU.

In the co-located frame, finding the CU at the corresponding position for the current CU is dependent on the motion information of the surrounding CU of the current CU. If the motion information of the surrounding CU is inaccurate, it will lead to the CU's motion information found at the corresponding position is also unreliable, thus affecting the encoding and decoding performance.

In order to improve the reliability of the operating information of the matching CU and optimize the encoding and decoding performance, in the embodiments of the present application, the motion information of the co-located CU in the co-located frame of the current CU is used to determine the matching CU, and the found matching CU is offset in a series of ways, such as up, down, left, right, etc, resulting in multiple temporal candidate modes, which to a certain extent can avoid the problem of inaccurate finding of matching CU due to inaccurate motion information of the surrounding CU.

The main implementation process of embodiments of the present application may include the following 6 parts:

Part 1 (may be indicated by A): encoding/parsing a value of an Enhanced Temporal Motion Vector Prediction (ETMVP) mode flag and an ETMVP mode index value according to the encoding/decoding conditions of the current CU;

Part 2 (may be indicated by B): determining coordinate information of an initial matching CU of a current CU according to coordinate information of the current CU;

Part 3 (may be indicated by C): constructing an enhanced temporal candidate list based on the coordinate information of the initial matching CU;

Part 4 (may be indicated by D): obtaining a corresponding ETMVP mode from the enhanced temporal candidate mode list according to the ETMVP mode index value, and determine coordinate information of a target matching CU corresponding to the ETMVP mode;

Part 5 (may be indicated by E): obtaining motion information of each subblock in the current CU according to the coordinate information of the target matching CU;

Part 6 (may be indicated by F): performing MC on the corresponding subblock in the current CU based on the motion information of each subblock in the current CU.

In the embodiments of the present application, the order of the above six parts may be adjusted.

To make the above purposes, features and advantages of the embodiments of the present application more obvious and understandable, the technical solution in the embodiments of the present application will be further described below in detail with the attached drawings.

Figure 3:
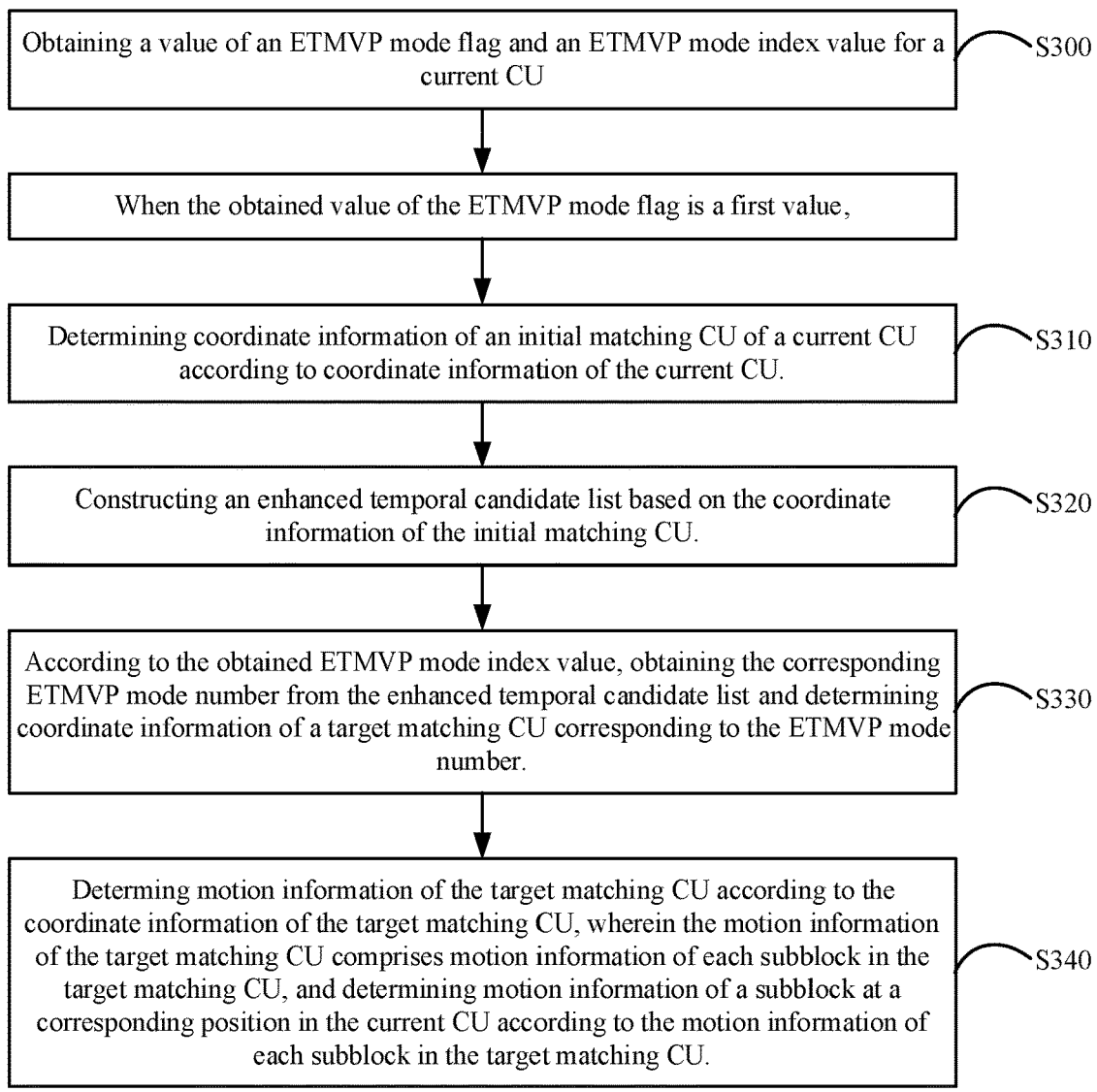
FIG. 3 is a flow diagram of a decoding method according to an embodiment of the present application.

Please see FIG. 3. It is a flow diagram of a decoding method provided by the embodiments of the present application, wherein the decoding method may be applied to a decoding device. As seen in FIG. 3, the process of the decoding method may include the following steps:

At Step S300, a value of an ETMVP mode flag and an ETMVP mode index value for a current CU are obtained.

In the embodiments of the present application, the current CU may be any CU in the picture to be processed. In an embodiment, the picture to be processed may be partitioned into different CU, and then each CU may be processed according to certain order. Wherein, the size and shape of each CU may be set according to preset partition rules.

For example, when decoding the current CU, a value of an ETMVP mode flag and an ETMVP mode index value for a current CU may be obtained;

For example, a value of an ETMVP mode flag of the current CU may be parsed from the bitstream, or is derived out when the current CU satisfies certain conditions.

For example, an ETMVP mode index value of the current CU may be parsed from the bitstream, or is derived out when the current CU satisfies certain conditions.

When the obtained value of the ETMVP mode flag is a first value, perform Step 310-Step 340.

For example, the value of the ETMVP mode flag can include a value that indicates that the ETMVP mode is enabled (referred to as a first value in the present application, such as 1).

At Step S310, coordinate information of an initial matching CU of a current CU is determined according to coordinate information of the current CU.

In the embodiments of the present application, if the obtained value of the ETMVP mode flag is a first value, it indicates that the current CU enables an ETMVP mode, then coordinate information of an initial matching CU can be determined.

For example, the coordinate information of the initial matching CU of the current CU can be determined according to the coordinate information of the current CU.

For example, the coordinate information of the initial matching CU can be the coordinate information of the initial matching CU in the corresponding reference picture, such as the upper-left corner coordinates.

At Step S320, an enhanced temporal candidate list is constructed based on the coordinate information of the initial matching CU.

In the embodiments of the present application, when the coordinate information of the initial matching CU of the current CU is determined, an enhanced temporal candidate list can be constructed based on the coordinate information of the initial matching CU.

For example, the enhanced temporal candidate list includes at least one ETMVP mode number.

For example, the coordinate information of the matching CU corresponding to different ETMVP mode numbers can be different.

At Step S330, the corresponding ETMVP mode number is obtained from the enhanced temporal candidate list according to the obtained ETMVP mode index value, and coordinate information of a target matching CU corresponding to the ETMVP mode number is determined.

In the embodiments of the present application, according to the ETMVP mode index value for a current CU obtained in Step S300, the corresponding ETMVP mode number can be obtained from the enhanced temporal candidate list, and coordinate information of the target matching CU corresponding to the ETMVP mode number can be determined.

For example, a target matching CU can be an initial matching CU, or the matching CU obtained by offsetting the initial matching CU up/down/left/right.

For example, coordinate information of the target matching CU can be consistent with coordinate information of the initial matching CU, or, adjusted according to the preset offset on the basis of the coordinate information of the initial matching CU.

At Step S340, motion information of the target matching CU is determined according to the coordinate information of the target matching CU, wherein the motion information of the target matching CU comprises motion information of each subblock in the target matching CU, and determine motion information of a subblock at a corresponding position in the current CU according to the motion information of each subblock in the target matching CU.

In the embodiments of the present application, when coordinate information of the target matching CU is determined, the motion information of the target matching CU can be determined according to the coordinate information of the target matching CU. For example, the motion information of the target matching CU comprises motion information of each subblock in the target matching CU.

For example, motion information of a subblock at a corresponding position in the current CU can be determined according to the motion information of each subblock in the target matching CU. For example, the motion information of the subblock at row h and column 1 in the current CU is determined based on the motion information of the subblock at row h and column 1 in the target matching CU.

In some embodiments, in Step S300, obtaining the value of the ETMVP mode flag for a current CU may include: when the current CU satisfies a first parsing condition, the value of the ETMVP mode flag is parsed from a bitstream; otherwise, the value of the ETMVP mode flag is determined as a second value, and when the value of the ETMVP mode flag is the second value, it indicates that the current CU disables the ETMVP mode.

For example, considering that the use of ETMVP mode usually needs to satisfy certain conditions, if these conditions are not met, the ETMVP mode may not be applicable. In that case, the value of the ETMVP mode flag can be derived out directly while it is not necessary to parse the bitstream to obtain the value of the ETMVP mode flag.

For example, according to whether the current CU satisfies the specified condition (referred to as a first parsing condition in the present application), it is determined whether to parse the value of the ETMVP mode flag for the current CU from the bitstream or to derive out the value of the ETMVP mode flag for the current CU directly.

For example, when the current CU satisfies a first parsing condition, parsing the value of the ETMVP mode flag from a bitstream; when the current CU does not satisfy a first parsing condition, it is not necessary to parse value of the ETMVP mode flag from a bitstream, but it can be determined that the current CU disables the ETMVP mode, and the value of the ETMVP mode flag for the current CU is the value indicating that the current CU disables the ETMVP mode (referred to as a second value in the present application).

In an embodiment, as described above, wherein the current CU satisfies a first parsing condition, which may include one or more of the following: a prediction mode of the current CU is skip mode or direct mode; the current CU has a size satisfying the preset size limit; according to sequence-level high-level syntax, the current CU enables ETMVP techniques; the current CU satisfies a condition for using Angular Weighted Prediction (AWP) or a condition for using Ultimate Motion Vector Expression (UMVE).

For example, considering that the ETMVP mode has certain use requirements on prediction mode and size of a CU, based on whether the prediction mode and/or size of the CU satisfy the requirements, it can be determined whether the ETMVP mode can be applied to the CU.

In addition, when the current CU disables ETMVP techniques according to high-level syntax, it can be determined that the current CU disables ETMVP.

For example, it can be determined that the current CU satisfies a first parsing condition when one or more of the following conditions are met: a prediction mode of the current CU is skip mode or direct mode; the current CU has a size satisfying the preset size limit; according to sequence-level high-level syntax, the current CU enables ETMVP techniques; the current CU satisfies a condition for using AWP or a condition for using UMVE.

For example, it is determined that the current CU satisfies a first parsing condition, when a prediction mode of the current CU is skip mode or direct mode, or when the current CU has a size satisfying the preset size limit, or when the current CU enables ETMVP techniques according to sequence-level high-level syntax, or when the current CU satisfies a condition for using AWP or a condition for using UMVE.

For example, when a prediction mode of the current CU is skip mode or direct mode, it is determined that the current CU satisfies a first parsing condition.

For example, when the current CU has a size satisfying the preset size limit, it is determined that the current CU satisfies a first parsing condition.

For example, when the current CU enables ETMVP techniques according to sequence-level high-level syntax, it is determined that the current CU satisfies a first parsing condition.

For example, when the current CU satisfies a condition for using AWP or a condition for using UMVE, it is determined that the current CU satisfies a first parsing condition.

As another example, if a prediction mode of the current CU is skip mode or direct mode, the current CU has a size satisfying the preset size limit, and according to sequence-level high-level syntax, the current CU enables ETMVP techniques, that is, when the above conditions are all met, it can be determined that the current CU satisfies a first parsing condition As another example, if a prediction mode of the current CU is skip mode or direct mode, the current CU has a size satisfying the preset size limit, according to sequence-level high-level syntax, the current CU enables ETMVP techniques, and the current CU satisfies a condition for using AWP or a condition for using UMVE, that is, when the above conditions are all met, it can be determined that the current CU satisfies a first parsing condition.

For example, the current CU has a size satisfying the preset size limit, which may include that the current CU has a width and a height which both are greater than or equal to N0. For example, N0=8.

It should be noted that the above description that the current CU has a size satisfying the preset size limit is only a specific example of related implementation in the embodiments of the present application, and is not a limitation of the protection scope of the present application. In the embodiments of the present application, the current CU has a size satisfying the preset size limit, which may also include other situations. For example, the width of the current CU is greater than or equal to N0, the height of the current CU is greater than or equal to N0, or, the height and width of the current CU are both greater than or equal to N0, and the width and height are not equal to N0 at the same time and so on.

For example, the current CU satisfies the condition for using AWP, which may include: according to the sequence-level high-level syntax, the current CU enables AWP techniques; the current CU has a width and a height which both are greater than or equal to N1 while less than or equal to N2; a current picture frame type is B picture.

For example, the current CU satisfies the condition for using UMVE, which may include: according to the sequence-level high-level syntax, the current CU enables UMVE techniques.

In an embodiment, the current CU satisfies a first parsing condition, which includes: a prediction mode of the current CU is skip mode or direct mode; the current CU has a size satisfying the preset size limit; according to sequence-level high-level syntax, the current CU enables ETMVP techniques; the current CU satisfies a condition for AWP or a condition for using UMVE.

In an embodiment, the ETMVP mode flag is encoded by Context-based Adaptive Binary Arithmetic Coding (CABAC) with a context model.

In another embodiment, the ETMVP mode flag is encoded by CABAC with multiple context models. For example, these multiple context models can be determined based on the size of the current CU. For example, the current CU size may be expressed as, including but not limited to: the width and/or height of the current CU, the maximum or minimum value of the width and height of the current CU, or the product of the width and height of the current CU.

In some embodiments, in Step S300, obtaining the ETMVP mode index value for the current CU may include: when the current CU satisfies a second parsing condition, parsing the ETMVP mode index value from a bitstream; otherwise, determining the ETMVP mode index value as a third value.

For example, if the ETMVP mode index value is the third value, it indicates that the current CU disables the ETMVP mode.

For example, considering that the use of ETMVP mode usually needs to satisfy certain conditions, if these conditions are not met, the ETMVP mode may not be applicable. In that case, the ETMVP mode index value can be derived out directly while it is not necessary to parse the bitstream to obtain the ETMVP mode index value.

For example, when the current CU satisfies the specified condition (referred to as a second parsing condition in the present application), the ETMVP mode index value may be parsed from a bitstream; otherwise, the ETMVP mode index value may be determined as a third value. If the ETMVP mode index value is the third value, it indicates that the current CU disables the ETMVP mode.

For example, the third value may be the same as the first value or second value mentioned above, or, may be different from both the first value and the second value mentioned above.

In an embodiment, the current CU satisfies a second parsing condition, which may include one or more of the following: a prediction mode of the current CU is skip mode or direct mode; the current CU enables the ETMVP mode.

In an embodiment, an inverse binarization of the ETMVP mode index value is realized based on a Truncated Unary with a maximum value of 4, wherein the Truncated Unary uses a bin string of up to 4 bins and each of the bins adopts a separate context model, so there are four context models in total.

For example, in order to lower encoding bitrate cost, and improve encoding and decoding performance, an inverse binarization of the ETMVP mode index value is realized based on a Truncated Unary with a maximum value of 4, wherein the Truncated Unary uses a bin string of up to 4 bins and each of the bins adopts a separate context model, so there are four context models in total.

The inverse binarization implementation of the ETMVP mode index value can be seen in Table 1:

TABLE 1

| cu_etmvp_cand_index | bin string |         |   |   |
|---------------------|------------|---------|---|---|
| 0                   | 1          |         |   |   |
| 1                   | 0          | 1       |   |   |
| 2                   | 0          | 0       | 1 |   |
| 3                   | 0          | 0       | 0 | 1 |
| 4                   | 0          | 0       | 0 | 0 |

Wherein, cu_etmvp_cand_index is the ETMVP mode index value.

In some embodiments, in Step S310, determining coordinate information of an initial matching CU of the current CU according to coordinate information of the current CU includes: determining a temporal reference picture where the matching CU is located according to the current picture frame type; determining the coordinate information of the initial matching CU in the temporal reference picture according to the coordinate information of the current CU.

For example, in order to determine coordinate information of an initial matching CU of the current CU, the frame type of the picture (herein also named as current picture) in which the current CU is located can be determined (as current picture frame type), and then based on the current picture frame type, the temporal reference picture in which the matching CU is located is determined.

For example, if the current picture frame type is P picture, the temporal reference picture is in the reference picture list 0, and its reference frame index value is 0; if the current picture frame type is B picture, the temporal reference picture is in the reference picture list 1, and its reference frame index value is 0.

For example, when the temporal reference picture in which the matching CU is located is determined, the coordinate information of the initial matching CU in the temporal reference picture can be determined according to according to the coordinate information of the current CU;

In an embodiment, the coordinate information of the current CU is the upper-left corner coordinate of the current CU in the current picture; the coordinate information of the matching CU is the upper-left corner coordinate of the matching CU in the temporal reference picture.

For example, the matching CU may include the initial matching CU or the target matching CU, that is, unless otherwise specified hereinafter, the coordinate information of the initial matching CU may refer to the upper-left corner coordinate of the initial matching CU, and the coordinate information of the target matching CU may refer to the upper-left corner coordinate of the target matching CU.

In an embodiment, as mentioned above, determining the coordinate information of the initial matching CU in the temporal reference picture according to the coordinate information of the current CU may include: determining the coordinate information of the initial matching CU according to the upper-left coordinate of the current LCU, the LCU size, the current picture size, the current CU size, and the upper-left coordinate of the current CU in the picture.

For example, a LCU may include one or more CUs.

For example, the coordinate information of the matching CU of the current CU can be determined according to the upper-left coordinate of the current LCU in the picture, the LCU size, the current CU size, the current picture size, and the upper-left coordinate of the current CU in the picture.

In an embodiment, as mentioned above, determining the coordinate information of the initial matching CU according to the upper-left coordinate of the current LCU in the picture, the LCU size, the current picture size, the current CU size, and the upper-left coordinate of the current CU in the picture may include: determining the initial matching CU's abscissa according to the current LCU's upper-left corner abscissa in the picture, the LCU size, the width of the current CU, the width of the current picture, and the current CU's upper-left corner abscissa in the picture; determining the initial matching CU's ordinate according to the current LCU's upper-left corner ordinate in the picture, the LCU size, the height of the current CU, the height of the current picture, and the current CU's upper-left corner ordinate in the picture.

For example, the coordinate information of the current CU is the upper-left corner coordinate of the current CU in the current picture; the coordinate information of the matching CU is the upper-left corner coordinate of the matching CU in the temporal reference picture.

For example, in the coordinate system in the picture plane, on the horizontal axis, the positive direction is to the right, and on the vertical axis, the positive direction is down (the same below).

For example, if (Xpos, Ypos) is the coordinate information of the current CU in the picture, (x_ctb_pos, y_ctb_pos) is the upper-left corner coordinate of the current LCU in the picture, the cu_width and cu_height are the width and height of the current CU, and the horizontal_size and vertical_size are the width and height of the current picture, lcu_size is the LCU size, the coordinates of the matching CU (Mx,My) is determined as follows:

$$Mx=\text{Clip3}(x\_ctb\_pos,\min(x\_ctb\_pos+lcu\_size-cu\_width,horizontal\_size-cu\_width),((Xpos+4)>>3)<<3)$$

$$My=\text{Clip3}(y\_ctb\_pos,\min(y\_ctb\_pos+lcu\_size-cu\_height,vertical\_size-cu\_height),((Ypos+4)>>3)<<3)$$

For example, if (Xpos, Ypos) is the coordinate information of the current CU in the picture, (x_ctb_pos, y_ctb_pos) is the upper-left corner coordinate of the current LCU in the picture, the cu_width and cu_height are the width and height of the current CU, and the horizontal_size and vertical_size are the width and height of the current picture, lcu_size is the LCU size, the coordinates of the matching CU (Mx,My) is determined as follows:

$$Mx=\min(((Xpos+4)>>3)<<3,\min(x\_ctb\_pos+lcu\_size-cu\_width,horizontal\_size-cu\_width))$$

$$My=\min(((Ypos+4)>>3)<<3,\min(y\_ctb\_pos+lcu\_size-cu\_height,vertical\_size-cu\_height))$$

In some embodiments, in Step S320, constructing an enhanced temporal candidate list based on the coordinate information of the initial matching CU may include: determining at least one ETMVP mode number according to the coordinate information of the initial matching CU; constructing an enhanced temporal candidate list according to at least one ETMVP mode number.

For example, the at least one ETMVP mode number may include: an ETMVP mode number corresponding to the coordinate information of the initial matching CU, and one or more ETMVP mode numbers corresponding to multiple new matching CU (if available) obtained by offsetting the initial matching CU.

For example, when at least one ETMVP mode number is determined according to the coordinate information of the initial matching CU, an enhanced temporal candidate list may be constructed according to the at least one ETMVP mode number.

For example, when the enhanced temporal candidate list is constructed, the length of the enhanced temporal candidate list can be initialized to zero (0), that is, the initial length of the enhanced temporal candidate list is 0.

For example, the length of the enhanced temporal candidate list can increase as the ETMVP mode numbers increase.

In an embodiment, the coordinate information of the matching CU is the upper-left corner coordinate of the matching CU in the temporal reference picture; the constructing an enhanced temporal candidate list according to at least one ETMVP mode number may include:

adding the ETMVP mode number 0 to the enhanced temporal candidate list and increasing the length of the enhanced temporal candidate list by 1;

if My+8 is less than or equal to the smaller values of y_ctb_pos+lcu_size−cu_height and vertical_size−cu_height, and the motion information of position A1 is different from the motion information of position C3 or the motion information of position A2 is different from the motion information of position C4, then adding the ETMVP mode number 1 to the enhanced temporal candidate list and increasing the length of the enhanced temporal candidate list by 1;

if Mx+8 is less than or equal to the smaller values of x_ctb_pos+lcu_size−cu_width and horizontal_size−cu_width, and the motion information of position A1 is different from the motion information of position B2 or the motion information of position A3 is different from the motion information of position B4, then adding the ETMVP mode number 2 to the enhanced temporal candidate list and increasing the length of the enhanced temporal candidate list by 1;

if My−8 is greater than or equal to y_ctb_pos, and the motion information of position A3 is different from the motion information of position C1 or the motion information of position A4 is different from the motion information of position C2, then adding the ETMVP mode number 3 to the enhanced temporal candidate list and increasing the length of the enhanced temporal candidate list by 1;

if Mx−8 is greater than or equal to x_ctb_pos, and the motion information of position A2 is different from the motion information of position B1 or the motion information of position A4 is different from the motion information of position B3, then adding the ETMVP mode number 4 to the enhanced temporal candidate list and increasing the length of the enhanced temporal candidate list by 1.

For example, wherein (Mx, My) is the coordinate information of the initial matching CU, (x_ctb_pos, y_ctb_pos) is the upper-left corner coordinate of the current LCU in the picture, lcu_size is the size of the LCU, the cu_width and cu_height are the width and height of the current CU, and the horizontal_size and vertical_size are the width and height of the current picture, respectively.

For example, A1 is the 4*4 block in the upper-left corner of the initial matching CU, B1 is the 4*4 block directly to the left of A1, and C1 is the 4*4 block directly above A1; A2 is the 4*4 block in the upper-right corner of the initial matching CU, B2 is the 4*4 block directly to the right of A2, and C2 is the 4*4 block directly above A2; A3 is the 4*4 block in the lower-left corner of the initial matching CU, B3 is the 4*4 block directly to the left of A3, and C3 is the 4*4 block directly below A3; A4 is the 4*4 block in the lower-right corner of the initial matching CU, B4 is the 4*4 block directly to the right of A4, and C4 is the 4*4 block directly below A4. Its diagram may be seen in FIG. 4.

For example, when offsetting a matching CU, the offset is in units of 8 pixels. For example, when offsetting a matching CU downward, the matching CU is offset downward by 8 pixels.

Considering that in the embodiments of the present application, a new matching CU is obtained by offsetting the matching CU up/down/left/right, add one or more candidate matching CUs to add new candidate motion information.

Taking the downward offset of the matching CU as an example, considering that when the motion information of the position A1 and position C3 is the same, and the motion information of the position A2 and position C4 is the same, there is high probability that the motion information of the new matching CU obtained by offsetting the matching CU downward will be the same as the motion information of the original matching CU, and this time the offset may not yield new motion information.

Therefore, when the motion information of position A1 is compared with position C3 while the motion information of position A2 is compared with position C4, and at least one of the two comparison results is inconsistent, it can be determined that new motion information can be obtained by a downward offset, that is, the matching CU obtained by the downward offset can be used as the candidate matching CU.

For example, when offsetting the matching CU, it is also necessary to ensure that the boundary, in the offset direction, of the new matching CU obtained after the offset, does not exceed the coordinate range corresponding to the LCU in which the matching CU (before the offset) is located, that is, it does not exceed the boundary of the LCU in the offset direction. And the boundary does not exceed the coordinate range corresponding to the picture where the matching CU is located, that is, it does not exceed the boundary of the picture in the offset direction.

For example, for an upward offset, the boundary in the direction of the offset is the upper boundary; for downward offset, the boundary in the offset direction is the lower boundary; for a left offset, the boundary in the offset direction is the left boundary; for right offset, the boundary in the offset direction is the right boundary.

For example, still taking downward offset as an example, when offsetting a matching CU downward, on the one hand, the offset ordinate (i.e. My+8) needs to be less than or equal to y_ctb_pos+lcu_size−cu_height (that is, the lower boundary of the new matching CU obtained after the offset does not exceed the lower boundary of the LCU where the matching CU is located before the offset), on the other hand, the offset ordinate needs to be less than or equal to vertical_size−cu_height (that is, the lower boundary of the new matching CU obtained after the offset does not exceed the lower boundary of the picture in which the matching CU is located before the offset), that is to say, My+8 needs to be less than or equal to the smaller one of y_ctb_pos+lcu_size−cu_height and vertical_size−cu_height.

In an embodiment, in Step S320, constructing an enhanced temporal candidate list based on the coordinate information of the initial matching CU may also include: when the length of the enhanced temporal candidate list is less than 5, performing the following operations in a loop until the length of the enhanced temporal candidate list equals to 5: adding another number in the enhanced temporal candidate list that is the same as the last ETMVP mode number in the list, and increasing the length of the enhanced temporal candidate list by 1.

For example, considering that when offsetting the matching CU up, down, left, right, all of which can obtain a usable candidate matching CU, the candidate matching CUs may include the matching CU before the offset, and the 4 matching CUs obtained by matching, that is, the length of the enhanced temporal candidate list is 5.

In order to improve the robustness of decoding and avoid decoding errors, when the length of the enhanced temporal candidate list constructed in the above way is less than 5, the length of the enhanced temporal candidate list can be extended to 5 by policy.

For example, when the length of the enhanced temporal candidate list is less than 5, another number that is the same as the last ETMVP mode number in the list can be added in the enhanced temporal candidate list, increasing the length of the enhanced temporal candidate list by 1; the operations are performed in a loop until the length of the enhanced temporal candidate list equals 5.

In some embodiments, according to the ETMVP mode index value, obtaining a corresponding ETMVP mode number from the enhanced temporal candidate list, and determining coordinate information of a target matching CU corresponding to the ETMVP mode number, may include:

if the ETMVP mode number is 0, then Px equals Mx, Py equals My;
if the ETMVP mode number is 1, then Px equals Mx, Py equals My+n;
if the ETMVP mode number is 2, then Px equals Mx+n, Py equals My;
if the ETMVP mode number is 3, then Px equals Mx, Py equals My−n;
if the ETMVP mode number is 4, then Px equals Mx−n, Py equals My;

For example, (Mx, My) is the upper-left corner coordinate of the initial matching CU, and (Px, Py) is the upper-left corner coordinate of the target matching CU.

For example, a new matching CU is obtained by offsetting the matching CU up/down/left/right by n pixels. For example, n=8.

Assume the ETMVP mode number corresponding to the initial matching CU is 0, the ETMVP mode number corresponding to the matching CU obtained by a downward offset is 1, the ETMVP mode number corresponding to the matching CU obtained by a right offset is 2, the ETMVP mode number corresponding to the matching CU obtained by a upward offset is 3, and the ETMVP mode number corresponding to the matching CU obtained by a left offset is 4.

When an enhanced temporal candidate list is constructed in the above way, according to the ETMVP mode index value obtained in Step S300, the corresponding ETMVP mode number can be obtained from the enhanced temporal candidate list.

For example, if the ETMVP mode number is 1, then the target matching CU is the temporal reference CU obtained by the overall downward offset of the initial matching CU by n pixels, that is, Px equals Mx, Py equals My+n.

If the ETMVP mode number is 2, then the target matching CU is the temporal reference CU obtained by the overall right offset of the initial matching CU by n pixels, that is, Px equals Mx+n, Py equals My.

If the ETMVP mode number is 3, then the target matching CU is the temporal reference CU obtained by the overall upward offset of the initial matching CU by n pixels, that is, Px equals Mx, Py equals My−n.

If the ETMVP mode number is 4, then the target matching CU is the temporal reference CU obtained by the overall left offset of the initial matching CU by n pixels, that is, Px equals Mx−n, Py equals My.

In some embodiments, in Step S340, determining motion information of a subblock at a corresponding position in the current CU according to the motion information of each subblock in the target matching CU may include: for any subblock in the target matching CU, when the current picture frame type is P picture, if the forward motion information of the subblock is available, then the forward motion information of the subblock is scaled to the first frame of List0, and the scaled forward motion information is given to the subblock at the corresponding position in the current CU.

In some embodiments, in Step S340, determining motion information of a subblock at a corresponding position in the current CU according to the motion information of each subblock in the target matching CU may include: for any subblock in the target matching CU, when the current picture frame type is B picture, if the forward motion information and backward motion information of the subblock are available, the forward motion information and backward motion information of the subblock are scaled respectively pointing to the first frame of List0 and the first frame of List1, and the scaled forward motion information and backward motion information are respectively given to the subblock at the corresponding position in the current CU; if the forward motion information of the subblock is available, but the backward motion information is unavailable, the forward motion information of the subblock is scaled pointing to the first frame of List0, and the scaled forward motion information is given to the subblock at the corresponding position in the current CU; if the backward motion information of the subblock is available, but the forward motion information is unavailable, the backward motion information of the subblock is scaled pointing to the first frame of List1, and the scaled backward motion information is given to the subblock at the corresponding position in the current CU.

For example, in order to improve the efficiency of determining the motion information of each subblock of the current CU, for any subblock in the target matching CU, whether the motion information of the subblock is available may be determined.

For example, when the current picture frame type is P picture, whether the forward motion information of the subblock is available may be determined; when the current picture frame type is B picture, whether the forward motion information and backward motion information of the subblock are available may be determined respectively.

For example, for any subblock in the target matching CU, when the forward motion information of the subblock is determined to be available, the forward motion information of the subblock may be scaled to the first frame of List0, and the scaled forward motion information is given to the subblock at the corresponding position in the current CU.

For example, for any subblock in the target matching CU, when the backward motion information of the subblock is determined to be available (when the current picture frame type is B picture), the backward motion information of the subblock may be scaled pointing to the first frame of List1, and the scaled backward motion information is given to the subblock at the corresponding position in the current CU.

For example, for any subblock in the target matching CU, when both the forward motion information and backward motion information of the subblock are determined to be both available (when the current picture frame type is B picture), the forward motion information and backward motion information of the subblock may be scaled respectively, pointing to the first frame of List0 and the first frame of List1, and the scaled forward motion information and backward motion information are respectively given to the subblock at the corresponding position in the current CU.

In some embodiments, in Step S340, determining motion information of a subblock at a corresponding position in the current CU according to the motion information of each subblock in the target matching CU may include: for any subblock in the target matching CU, when the current picture frame type is P picture, if the forward motion information of the subblock is unavailable, when the forward motion information of a first surrounding block of the current CU is available, the forward motion information of the first surrounding block is scaled to the first frame of List0, and the scaled forward motion information is given to the subblock at the corresponding position in the current CU; when the forward motion information of the first surrounding block is unavailable, the zero motion information is given to the subblock at the corresponding position in the current CU; when the current picture frame type is B picture, if neither the forward motion information nor backward motion information of the subblock is available, when both the forward motion information and backward motion information of the first surrounding block of the current CU are available, the forward motion information and backward motion information of the first surrounding block are scaled to the first frame of List0 and the first frame of List1 respectively, and the scaled forward motion information and scaled backward motion information are given to the subblock at the corresponding position in the current CU respectively; when the forward motion information of the first surrounding block is available, but its backward motion information is unavailable, its forward motion information is scaled to the first frame of List0, and the scaled forward motion information is given to the subblock at the corresponding position in the current CU; when the backward motion information of the first surrounding block is available, but its forward motion information is unavailable, its backward motion information is scaled to the first frame of List1, and the scaled backward motion information is given to the subblock at the corresponding position in the current CU; when neither the forward motion information nor the backward motion information of the first surrounding block is available, the zero motion information is given to the subblock at the corresponding position in the current CU.

For example, the motion information of the subblock in the current CU may be determined according to the motion information of a surrounding block of the current CU (referred to as a first surrounding block in the present application).

For example, a first surrounding block of the current CU may include but not limited to any decoded neighboring block or non-neighboring block of the current CU.

Figure 5:
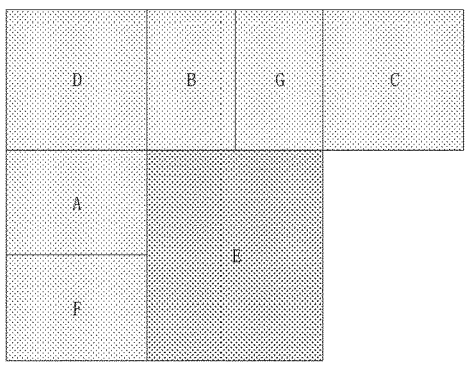
FIG. 5 is a diagram of a first surrounding block of the current CU according to an embodiment of the present application.

For example, a first surrounding block of the current CU may be seen in FIG. 5. As seen in FIG. 5, E is the current CU, and the first surrounding block of the current CU may include any one of A, B, C, D, F, and G.

For example, a CU includes at least one subblock, the width of each subblock does not exceed the width of the current CU, and the height of each subblock does not exceed the height of the current CU, for example, each subblock is an 8*8 block.

In an embodiment, the first surrounding block of the current CU is F in FIG. 5. For example, the size of F can be 8*8, that is, the first surrounding block is the 8*8 block neighboring to the lower-left corner of the current CU. For example, the size of F can be 4*4, that is, the first surrounding block is the 4*4 block neighboring to the lower-left corner of the current CU.

For example, when the current picture frame type is P picture, when the forward motion information of the subblock of the target matching CU is unavailable, the motion information of the subblock of the current CU may also be determined according to the motion information of the first surrounding block of the current CU.

For example, when the current picture frame type is B picture, when neither the forward motion information nor the backward motion information of the subblock of the target matching CU is available, the motion information of the subblock of the current CU may also be determined according to the motion information of the first surrounding block of the current CU.

For example, when the current picture frame type is P picture, when neither the forward motion information of the subblock of the target matching CU nor the forward motion information of the first surrounding block of the current picture CU is available, zero motion information may be given to the subblock at the corresponding position in the current CU.

For example, when the current picture frame type is B picture, when neither the forward motion information nor the backward motion information of the subblock of the target matching CU is available, and when neither the forward motion information nor the backward motion information of the first surrounding block is available, zero motion information may be given to the subblock at the corresponding position in the current CU.

Figure 6:
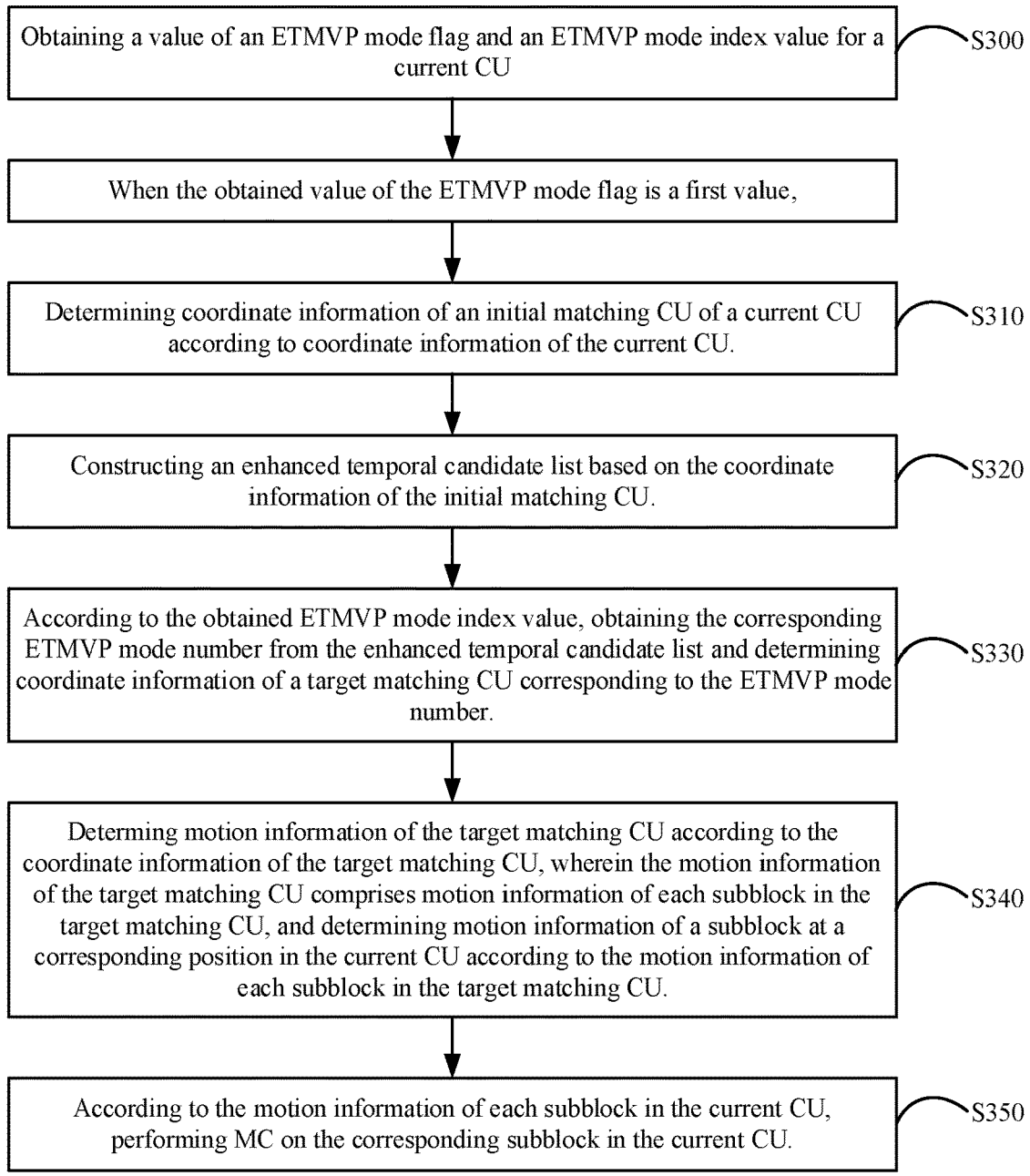
FIG. 6 is a flow diagram of another decoding method according to an embodiment of the present application.

In some embodiments, as seen in FIG. 6, after determining the motion information of the subblock at the corresponding position in the current CU according to the motion information of each subblock in the target matching CU in Step S340, the method may further include Step S350: according to the motion information of each subblock in the current CU, performing MC on the corresponding subblock in the current CU.

For example, when the motion information of each subblock in the current CU is determined as mentioned above, according to the motion information of each subblock in the current CU, MC may be performed on the corresponding subblock in the current CU. For example, MC may be performed on the subblock at row h and column 1 in the current CU, according to the motion information of the subblock at row h and column 1 in the current CU.

In an embodiment, Step S350, according to the motion information of each subblock in the current CU, performing MC on the corresponding subblock in the current CU may include: for any subblock of the current CU, not using DMVR for its motion information; if the subblock satisfies the application conditions of BIO, MC is performed on the subblock according to the motion information of the subblock, and BIO techniques are used to add the optical flow offset value to the compensated pixel value, then the prediction sample matrix of the subblock is obtained; otherwise, performing MC on the subblock according to the motion information of the subblock, and obtaining the prediction sample matrix of the subblock.

For example, the prediction samples of the current CU are composed of prediction samples of each subblock.

In an embodiment, the subblock satisfies the application conditions of BIO, which includes: according to sequence-level high-level syntax, BIO techniques is enabled; the MV accuracy of the current CU equals 0; the subblock uses bi-prediction; for this subblock, the reference frame whose index value is refIdxL0 in the reference picture list 0 and the reference frame whose index value is refIdxL1 in the reference picture list 1 are respectively displayed on both sides of the current frame.

For example, the embodiments of the present application also provide an encoding method, wherein the encoding method may be applied to an encoding device, the method may include the following steps.

At step T100, coordinate information of an initial matching CU of the current CU is determined according to coordinate information of the current CU. Details for implementing this step may be referred to the description of step S310 in the embodiment as illustrated in FIG. 3 and would not be duplicated here.

At step T110, an enhanced temporal candidate list is constructed based on the coordinate information of the initial matching CU. Details for implementing this step may be referred to the description of step S320 in the embodiment as illustrated in FIG. 3 and would not be duplicated here.

At step T120, coordinate information of a target matching CU corresponding to each ETMVP mode number in the enhanced temporal candidate list is determined by going through ETMVP mode numbers in the enhanced temporal candidate list sequentially.

For example, when an enhanced temporal candidate list is constructed in a way as described in Step T110, the encoding device can go through the ETMVP mode numbers in the enhanced temporal candidate list.

For each candidate ETMVP mode number, the encoding device can determine the coordinate information of the corresponding target matching CU according to the candidate ETMVP mode number. Details for implementing this step may be referred to the description of step S330 in the embodiment as illustrated in FIG. 3 and would not be duplicated here.

At Step T130, motion information of the target matching CU is determined according to the coordinate information of the target matching CU, wherein the motion information of the target matching CU includes motion information of each subblock in the target matching CU, and motion information of a subblock at a corresponding position in the current CU is determined according to the motion information of each subblock in the target matching CU. Details for implementing this step may be referred to the description of step S340 in the embodiment as illustrated in FIG. 3 and would not be duplicated here.

At Step T140, MC is performed on the corresponding subblock in the current CU according to the motion information of each subblock in the current CU. Details for implementing this step may be referred to the description of step S350 in the embodiment as illustrated in FIG. 6 and would not be duplicated here.

At Step T150, a rate-distortion cost of each ETMVP mode is calculated, the rate-distortion costs are compared with respective rate-distortion costs of other prediction modes to select a prediction mode corresponding to a smallest rate-distortion cost, and an ETMVP mode flag and an ETMVP mode index value of the selected prediction modes are recorded into a bitstream to be transmitted to a decoding device.

For example, the encoding device can determine the prediction mode with the smallest rate-distortion cost based on the RDO decision, and determine the value of the ETMVP mode flag and the ETMVP mode index value according to the prediction mode corresponding to the smallest rate-distortion cost, and record it into a bitstream to be transmitted to a decoding device.

For example, the implementation process of encoding and decoding of the above embodiments can refer to each other.

In order to enable those skilled in the art to better understand the technical solutions provided by the embodiments of the present application, the following is a description of the technical solutions provided by embodiments of the present application in combination with specific examples.

Embodiment 1

The embodiments of the present application provide an enhanced temporal motion information prediction method, by which the motion information of the co-located CU in the co-located frame of the current CU is used to determine the matching CU, and the found matching CU is offset in a series of ways, such as up, down, left, right, etc, resulting in multiple temporal candidate modes, which to a certain extent can avoid the problem of inaccurate found matching CU due to inaccurate motion information of the surrounding CU.

The main implementation process of the embodiments of the present application may include the following 6 parts:

Part 1, encoding/parsing a value of an Enhanced Temporal Motion Vector Prediction (ETMVP) mode flag and an ETMVP mode index value according to the encoding/decoding conditions of the current CU;

Part 2, determining coordinate information of an initial matching CU of a current CU according to coordinate information of the current CU;

Part 3, constructing an enhanced temporal candidate list based on the coordinate information of the initial matching CU;

Part 4, obtaining a corresponding ETMVP mode from the enhanced temporal candidate mode list according to the ETMVP mode index value, and determine coordinate information of a target matching CU corresponding to the ETMVP mode;

Part 5, obtaining motion information of each subblock in the current CU according to the coordinate information of the target matching CU;

Part 6, performing MC on the corresponding subblock in the current CU based on the motion information of each subblock in the current CU.

For example, the order of the above six parts may be adjusted.

Embodiment 2

An encoding method which the embodiments of the present application provide may include the following steps:

Step 1, determining coordinate information of an initial matching CU of a current CU according to coordinate information of the current CU;

Step 2, constructing an enhanced temporal candidate list based on the coordinate information of the initial matching CU;

Step 3, determining coordinate information of a target matching CU corresponding to each enhanced temporal candidate mode in the enhanced temporal candidate list by going through ETMVP mode numbers in the enhanced temporal candidate list sequentially;

Step 4, determining the motion information of each subblock in the current CU according to the motion information corresponding to the coordinate information of the target matching CU;

Step 5, performing MC on the corresponding subblock in the current CU according to the motion information of each subblock in the current CU.

Step 6, calculating a rate-distortion cost of each ETMVP mode, comparing the rate-distortion costs with respective rate-distortion costs of other prediction modes to select a prediction mode corresponding to a smallest rate-distortion cost; and recording an ETMVP mode flag and an ETMVP mode index value of the selected prediction modes into a bitstream to be transmitted to a decoding device.

Embodiment 3

A decoding method which the embodiments of the present application provide may include the following steps:

Step 1, obtaining a value of an ETMVP mode flag and an ETMVP mode index value for a current CU; when the value of the ETMVP mode flag is a first value, performing Step 2-6.

Step 2, determining coordinate information of an initial matching CU of a current CU according to coordinate information of the current CU;

Step 3, constructing an enhanced temporal candidate list based on the coordinate information of the initial matching CU;

Step 4, obtaining the corresponding ETMVP mode number from the enhanced temporal candidate list according to the obtained ETMVP mode index value, and determine coordinate information of a target matching CU corresponding to the ETMVP mode number;

Step 5, determining the motion information of each subblock in the current CU according to the motion information corresponding to the coordinate information of the target matching CU;

Step 6, performing MC on the corresponding subblock in the current CU according to the motion information of each subblock in the current CU.

Combined with embodiments, the parts of the main process of the embodiments of the present application (i.e., Part 1~Part 6) are described below.

Part 1, encoding/parsing a value of an ETMVP mode flag and an ETMVP mode index value For example, parsing a value of an ETMVP mode flag and an ETMVP mode index value may include: 1) parsing a value of an ETMVP mode flag (can be recorded as etmvp_flag); 2) parsing an ETMVP mode index value (can be recorded as cu_etmvp_cand_index).

Embodiment 4

If the current CU satisfies a parsing condition 1 (i.e., the first parsing condition), the value of an ETMVP mode flag is parsed from the bitstream, otherwise, the value of an ETMVP mode flag is 0 (i.e., the second value is 0).

For example, the current CU satisfies a parsing condition 1, which may refer to Embodiment 5~Embodiment 10, separately.

Embodiment 5

The current CU satisfies a parsing condition 1, which includes: a prediction mode of the current CU is skip mode or direct mode.

Embodiment 6

The current CU satisfies a parsing condition 1, which includes: the current CU size satisfies one of the following limits (i.e., the preset size limits): the current CU has a width and a height which both are greater than or equal to NO. For example, NO equals 8.

Embodiment 7

The current CU satisfies a parsing condition 1, which includes: according to sequence-level high-level syntax, the current CU enables ETMVP techniques.

Embodiment 8

The current CU satisfies a parsing condition 1, which includes: the current CU satisfies a condition for using AWP or a condition for using UMVE.

For example, a condition for using AWP may include: according to the sequence-level high-level syntax, the current CU enables AWP techniques; the current CU has a width and a height which both are greater than or equal to N1 while less than or equal to N2; a current picture frame type is B picture.

For example, N1=8. For example, N2=64.

For example, a condition for using UMVE may include: according to the sequence-level high-level syntax, the current CU enables UMVE techniques.

Embodiment 9

The current CU satisfies a parsing condition 1, which includes:
- a prediction mode of the current CU is skip mode or direct mode;
- the current CU has a size satisfying the following preset size limit;
- the current CU has a width and a height which both are greater than or equal to 8. For example, N0=8.
- according to sequence-level high-level syntax, the current CU enables ETMVP techniques.

Embodiment 10

The current CU satisfies a parsing condition 1, which includes:
- a prediction mode of the current CU is skip mode or direct mode;
- the current CU has a size satisfying the following preset size limit;
- the current CU has a width and a height which both are greater than or equal to 8. For example, N0=8.
- according to sequence-level high-level syntax, the current CU enables ETMVP techniques.
- the current CU satisfies a condition for using AWP or a condition for using UMVE.

For example, a condition for using AWP may include:
- according to the sequence-level high-level syntax, the current CU enables AWP techniques;
- the current CU has a width and a height which both are greater than or equal to N1 while less than or equal to N2;
- a current picture frame type is B picture;

For example, N1=8. For example, N2=64.

For example, a condition for using UMVE may include: according to the sequence-level high-level syntax, the current CU enables UMVE techniques.

It should be noted that, in the embodiments of the present application, that a current CU satisfies the parsing condition 1 is not limited to the situation described above in embodiments 5-10 mentioned above, which may also include the combination of any two embodiments in embodiments 5-8, and the combination of any three embodiments (the combination of embodiments 5-7 is Embodiment 9).

Embodiment 11

If the current CU satisfies a parsing condition 1, the value of an ETMVP mode flag is parsed from the bitstream; otherwise, the value of an ETMVP mode flag is 0.

For example, the ETMVP mode flag is encoded by Context-based Adaptive Binary Arithmetic Coding (CABAC).

Embodiment 12

If the current CU satisfies a parsing condition 1, the value of an ETMVP mode flag is parsed from the bitstream; otherwise, the value of an ETMVP mode flag is 0.

For example, the specific situation that the current CU satisfies a parsing condition 1 may refer to the relevant description in the above embodiments, such as any one of embodiments 5-10.

For example, the ETMVP mode flag is encoded by CABAC with a context model.

Embodiment 13

If the current CU satisfies a parsing condition 1, the value of an ETMVP mode flag is parsed from the bitstream; otherwise, the value of an ETMVP mode flag is 0.

For example, the specific situation that the current CU satisfies a parsing condition 1 may refer to the relevant description in the above embodiments, such as any one of embodiments 5-10.

For example, the ETMVP mode flag is encoded by CABAC with multiple context models.

For example, these multiple context models can be determined based on the size of the current CU.

For example, the current CU size may be expressed as, including but not limited to: the width and/or height of the current CU, the maximum or minimum value of the width and height of the current CU, or the product of the width and height of the current CU.

Embodiment 14

If the current CU satisfies a parsing condition 2 (i.e., the second parsing condition), the ETMVP mode index value is parsed from the bitstream; otherwise, the ETMVP mode index value is 0 (i.e., the third value is 0).

For example, the specific situation that the current CU satisfies a parsing condition may refer to embodiments 1517 separately.

Embodiment 15

The current CU satisfies a parsing condition 2, which includes: a prediction mode of the current CU is skip mode or direct mode.

Embodiment 16

The current CU satisfies a parsing condition 2, which includes: according to sequence-level high-level syntax, the current CU enables ETMVP mode.

Embodiment 17

The current CU satisfies a parsing condition 2, which includes:
- a prediction mode of the current CU is skip mode or direct mode;
- the current CU enables the ETMVP mode.

For example, the syntax description of the ETMVP mode index value may be as follows:

if ((SkipFlag || DirectFlag) && EtmvpFlag) {
   cu_etmvp_cand_index                                   ae(v)

Embodiment 18

If the current CU satisfies a parsing condition 2 (i.e., the second parsing condition), the ETMVP mode index value is parsed from the bitstream; otherwise, the ETMVP mode index value is 0 (i.e., the third value is 0).

For example, the specific situation that the current CU satisfies a parsing condition 2 may refer to the description in any one of embodiments 15-17.

For example, an inverse binarization of the ETMVP mode index value is realized based on a Truncated Unary with a maximum value of 4, wherein the Truncated Unary uses a bin string of up to 4 bins and each of the bins adopts a separate context model, so there are four context models in total. For example, the inverse binarization implementation of the ETMVP mode index value may be seen in Table 1.

Part 2, determining coordinate information of an initial matching CU of a current CU according to coordinate information of the current CU For example, determining coordinate information of an initial matching CU of the current CU according to coordinate information of the current CU may include: determining a temporal reference picture where the matching CU is located according to the current picture frame type; determining the coordinate information of the initial matching CU of the current CU according to the coordinate information of the current CU.

For example, in the temporal reference picture, the temporal reference block whose width and height are respectively the same as the width and height of the current CU is determined to be the matching CU of the current CU.

For example, if the current picture frame type is P picture, the temporal reference picture is in the reference picture list 0, and its reference frame index value is 0; if the current picture frame type is B picture, the temporal reference picture is in the reference picture list 1, and its reference frame index value is 0.

For example, the coordinate information of the current CU may be the upper-left corner coordinate of the current CU in the picture (the current picture); the coordinate information of the matching CU may be the upper-left corner coordinate of the matching CU in the temporal reference picture.

For example, determining coordinate information of an initial matching CU of the current CU according to coordinate information of the current CU may include: determining the coordinate information of the initial matching CU based on the upper-left coordinate of the current LCU in the picture, the LCU size, the current picture size, the current CU size, and the upper-left coordinate of the current CU in the picture.

For example, based on the upper-left coordinate of the current LCU in the picture, the LCU size, the current picture size, the current CU size, and the upper-left coordinate of the current CU in the picture, determining the coordinate information of the initial matching CU includes: determining the initial matching CU's abscissa according to the current LCU's upper-left corner abscissa in the picture, the LCU size, the width of the current CU, the width of the current picture, and the current CU's upper-left corner abscissa in the picture; determining the initial matching CU's ordinate according to the current LCU's upper-left corner ordinate in the picture, the LCU size, the height of the current CU, the height of the current picture, and the current CU's upper-left corner ordinate in the picture.

For example, the specific implementation of determining coordinate information of an initial matching CU for he current CU according to coordinate information of the current CU may refer to the description in any one of embodiments 19-21.

Embodiment 19

If (Xpos, Ypos) is the upper-left corner coordinate of the current CU in the picture, (x_ctb_pos, y_ctb_pos) is the upper-left corner coordinate of the current LCU in the picture, the cu_width and cu_height are the width and height of the current CU, and the horizontal_size and vertical_size are the width and height of the current picture, lcu_size is the LCU size, the coordinates of the matching CU (Mx,My) is determined as follows:

$Mx = \text{Clip3}(x\_ctb\_pos, \min(x\_ctb\_pos + lcu\_size - cu\_width, horizontal\_size - cu\_width), ((Xpos+4) >> 3) << 3)$ $My = \text{Clip3}(y\_ctb\_pos, \min(y\_ctb\_pos + lcu\_size - cu\_height, vertical\_size - cu\_height), ((Ypos+4) >> 3) << 3)$ Embodiment 20

If (Xpos, Ypos) is the upper-left corner coordinate of the current CU in the picture, (x_ctb_pos, y_ctb_pos) is the upper-left corner coordinate of the current LCU in the picture, the cu_width and cu_height are the width and height of the current CU, and the horizontal_size and vertical_size are the width and height of the current picture, lcu_size is the LCU size, the coordinates of the matching CU (Mx,My) is determined as follows:

$Mx = \min(((Xpos+4) >> 3) << 3, \min(x\_ctb\_pos + lcu\_size - cu\_width, horizontal\_size - cu\_width))$ $My = \min(((Ypos+4) >> 3) << 3, \min(y\_ctb\_pos + lcu\_size - cu\_height, vertical\_size - cu\_height))$ Embodiment 21

If (Xpos, Ypos) is the upper-left corner coordinate of the current CU in the picture, (x_ctb_pos, y_ctb_pos) is the upper-left corner coordinate of the current LCU in the picture, the cu_width and cu_height are the width and height of the current CU, and the horizontal_size and vertical_size are the width and height of the current picture, lcu_size is the LCU size, the coordinates of the matching CU (Mx,My) is determined as follows:

$Mx = \text{Clip3}(x\_ctb\_pos, \min(x\_ctb\_pos + lcu\_size - cu\_width, horizontal\_size - cu\_width), ((Xpos) >> 3) << 3)$ $My = \text{Clip3}(y\_ctb\_pos, \min(y\_ctb\_pos + lcu\_size - cu\_height, vertical\_size - cu\_height), ((Ypos) >> 3) << 3)$ Embodiment 22

If (Xpos, Ypos) is the upper-left corner coordinate of the current CU in the picture, the coordinates of the matching CU (Mx, My) may be determined as follows:

$Mx = (Xpos >> shift) << shift$ $My = (Ypos >> shift) << shift$

For example, shift is related to the size of a subblock, for a N*N subblock, N=1<<shift. For example, if the subblock size is 8*8, shift=3.

Figure 4:
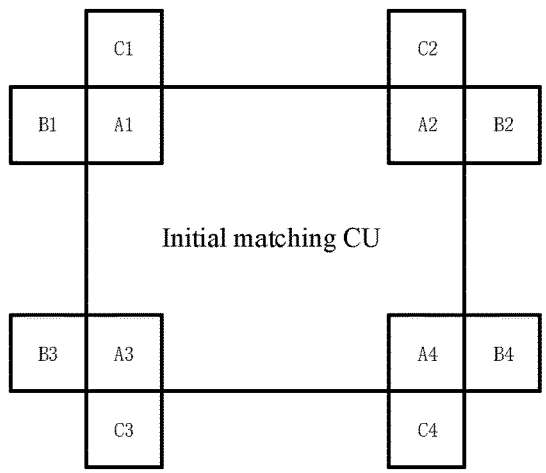
FIG. 4 is a diagram of a reference block when offsetting a matching coding unit (CU) according to an embodiment of the present application.

Part 3, constructing an enhanced temporal candidate list based on the coordinate information of the initial matching CU For example, if (Mx,My) is the upper-left corner coordinate of the initial matching CU in the temporal reference picture, A1~A4, B1~B4, C1~C4 are the neighboring 4*4 blocks around the initial matching CU in the temporal reference picture, and the diagram may be seen in FIG. 4.

Embodiment 23

23.0, initializing the length of the enhanced temporal candidate list to 0. For example, the initial length of the enhanced temporal candidate list is 0.

23.1, adding the ETMVP mode number 0 to the enhanced temporal candidate list, and increasing the length of the enhanced temporal candidate list by 1;

23.2, if the matching CU where (Mx, My) is located does not exceed the lower boundary of the LCU or the picture where the matching CU is located, and the motion information of position A1 is different from the motion information of position C3 or the motion information of position A2 is different from the motion information of position C4, then adding the ETMVP mode number 1 into the enhanced temporal candidate list and increasing the length of the enhanced temporal candidate list by 1;

23.3, if the matching CU where (Mx, My) is located does not exceed the right boundary of the LCU or the picture where the matching CU is located, and the motion information of position A1 is different from the motion information of position B2 or the motion information of position A3 is different from the motion information of position B4, adding the ETMVP mode number 2 into the enhanced time domain candidate list and increasing the length of the enhanced temporal candidate list by 1;

23.4, if the matching CU where (Mx, My) is located does not exceed the upper boundary of the LCU or the picture where the matching CU is located, and the motion information of position A3 is different from the motion information of position C1 or the motion information of position A4 is different from the motion information of position C2, adding the ETMVP mode number 3 into the enhanced time domain candidate list and increasing the length of the enhanced temporal candidate list by 1;

23.5, if the matching CU where (Mx, My) is located does not exceed the left boundary of the LCU or picture where the matching CU is located, and the motion information of position A2 is different from the motion information of position B1 or the motion information of position A4 is different from the motion information of position B3, adding the ETMVP mode number 4 into the enhanced time domain candidate list and increasing the length of the enhanced temporal candidate list by 1;

23.6, when the length of the enhanced temporal candidate list is less than 5, performing the following operations in a loop:

23.6.1, adding another number in the enhanced temporal candidate list that is the same as the last ETMVP mode number in the list, and increasing the length of the enhanced temporal candidate list by 1;

23.6.2, if the length of the enhanced temporal candidate list equals 5, terminating the process of constructing the list.

For example, its implementation logic may be as follows:
1), initializing EtmvpCandArray[i] to 0, i=0-4; initializing length to 0;
2), first, EtmvpCandArray[0]=0, length increasing by 1;
3), if the matching CU where (Mx, My) is located does not exceed the lower boundary of the LCU or the picture where the matching CU is located, and the motion information of position A1 is different from the motion information of position C3 or the motion information of position A2 is different from the motion information of position C4, then EtmvpCandArray[length]=1, length increasing by 1;
4), if the matching CU where (Mx, My) is located does not exceed the right boundary of the LCU or the picture where the matching CU is located, and the motion information of position A1 is different from the motion information of position B2 or the motion information of position A3 is different from the motion information of position B4, then EtmvpCandArray[length]=2, length increasing by 1;
5), if the matching CU where (Mx, My) is located does not exceed the upper boundary of the LCU or the picture where the matching CU is located, and the motion information of position A3 is different from the motion information of position C1 or the motion information of position A4 is different from the motion information of position C2, then EtmvpCandArray[length]=3, length increasing by 1;
6), if the matching CU where (Mx, My) is located does not exceed the left boundary of the LCU or picture where the matching CU is located, and the motion information of position A2 is different from the motion information of position B1, or the motion information of position A4 is different from the motion information of position B3, then EtmvpCandArray[length]=4, length increasing by s 1;
7), if length is less than 5, perform the following operations in a loop:
7.1), EtmvpCandArray[length]=EtmvpCandArray[length−1], length increasing by 1.
7.2), if length equals 5, terminating the process of constructing the list.

Embodiment 24

24.0, initializing the length of the enhanced temporal candidate list to 0. For example, the initial length of the enhanced temporal candidate list is 0.

24.1, adding the ETMVP mode number 0 to the enhanced temporal candidate list and increasing the length of the enhanced temporal candidate list by 1;

24.2, if the matching CU where (Mx, My) is located does not exceed the lower boundary of the LCU or the picture where the matching CU is located, and the motion information of position A1 is different from the motion information of position C3 or the motion information of position A2 is different from the motion information of position C4, then adding the ETMVP mode number 1 to the enhanced temporal candidate list and increasing the length of the enhanced temporal candidate list by 1;

24.3, if the matching CU where (Mx, My) is located does not exceed the right boundary of the LCU or the picture where the matching CU is located, and the motion information of position A1 is different from the motion information of position B2 or the motion information of position A3 is different from the motion information of position B4, then adding the ETMVP mode number 2 to the enhanced temporal candidate list and increasing the length of the enhanced temporal candidate list by 1;

24.4, if the matching CU where (Mx, My) is located does not exceed the upper boundary of the LCU or the picture where the matching CU is located, and the motion information of position A3 is different from the motion information of position C1 or the motion information of position A4 is different from the motion information of position C2, then adding the ETMVP mode number 3 to the enhanced temporal candidate list and increasing the length of the enhanced temporal candidate list by 1;

24.5, if the matching CU where (Mx, My) is located does not exceed the left boundary of the LCU or picture where the matching CU is located, and the motion information of position A2 is different from the motion information of position B1 or the motion information of position A4 is different from the motion information of position B3, then adding the ETMVP mode number 4 into the enhanced temporal candidate list and increasing the length of the enhanced temporal candidate list by 1;

Embodiment 25

25.0, initializing the length of the enhanced temporal candidate list to 0. For example, the initial length of the enhanced temporal candidate list is 0.

25.1, adding the ETMVP mode number 0 to the enhanced temporal candidate list and increasing the length of the enhanced temporal candidate list by 1. For example, the initial length of the enhanced temporal candidate list is 0.

25.2, if the matching CU where (Mx, My+8) is located does not exceed the lower boundary of the LCU or the picture where the matching CU is located, and the motion information of position A1 is different from the motion information of position C3 or the motion information of position A2 is different from the motion information of position C4, adding the ETMVP mode number 1 to the enhanced time domain candidate list and increasing the length of the enhanced temporal candidate list by 1;

25.3, if the matching CU where (Mx+8, My) is located does not exceed the right boundary of the LCU or the picture where the matching CU is located, and the motion information of position A1 is different from the motion information of position B2 or the motion information of position A3 is different from the motion information of position B4, adding the ETMVP mode number 2 to the enhanced time domain candidate list and increasing the length of the enhanced temporal candidate list by 1;

25.4, if the matching CU where (Mx, My−8) is located does not exceed the upper boundary of the LCU or the picture where the matching CU is located, and the motion information of position A3 is different from the motion information of position C1 or the motion information of position A4 is different from the motion information of position C2, adding the ETMVP mode number 3 to the enhanced time domain candidate list and increasing the length of the enhanced temporal candidate list by 1;

25.5, if the matching CU where (Mx−8, My) is located does not exceed the left boundary of the LCU or picture where the matching CU is located, and the motion information of position A2 is different from the motion information of position B1 or the motion information of position A4 is different from the motion information of position B3, adding the ETMVP mode number 4 to the enhanced time domain candidate list and increasing the length of the enhanced temporal candidate list by 1;

25.6, if the length of the enhanced temporal candidate list is less than 5, performing the following operations in a loop:

25.6.1, adding another number in the enhanced temporal candidate list that is the same as the last ETMVP mode number in the list, and increasing the length of the enhanced temporal candidate list by 1;

25.6.2, if the length of the enhanced temporal candidate list equals 5, terminating the process of constructing the list.

Embodiment 26

26.0, initializing the length of the enhanced temporal candidate list to 0.

26.1, adding the ETMVP mode number 0 to the enhanced temporal candidate list, and increasing the length of the enhanced temporal candidate list by 1. For example, the initial length of the enhanced temporal candidate list is 0.

26.2, if the matching CU where (Mx, My+8) is located does not exceed the lower boundary of the LCU or the picture where the matching CU is located, and the motion information of position A1 is different from the motion information of position C3 or the motion information of position A2 is different from the motion information of position C4, adding the ETMVP mode number 1 to the enhanced time domain candidate list and increasing the length of the enhanced temporal candidate list by 1;

26.3, if the matching CU where (Mx+8, My) is located does not exceed the right boundary of the LCU or the picture where the matching CU is located, and the motion information of position A1 is different from the motion information of position B2 or the motion information of position A3 is different from the motion information of position B4, adding the ETMVP mode number 2 to the enhanced time domain candidate list and increasing the length of the enhanced temporal candidate list by 1;

26.4, if the matching CU where (Mx, My−8) is located does not exceed the upper boundary of the LCU or the picture where the matching CU is located, and the motion information of position A3 is different from the motion information of position C1 or the motion information of position A4 is different from the motion information of position C2, adding the ETMVP mode number 3 to the enhanced time domain candidate list and increasing the length of the enhanced temporal candidate list by 1;

26.5, if the matching CU where (Mx−8, My) is located does not exceed the left boundary of the LCU or picture where the matching CU is located, and the motion information of position A2 is different from the motion information of position B1 or the motion information of position A4 is different from the motion information of position B3, adding the ETMVP mode number 4 to the enhanced time domain candidate list and increasing the length of the enhanced temporal candidate list by 1;

Embodiment 27

27.0, initialize the length of the enhanced temporal candidate list to 0. For example, the initial length of the enhanced temporal candidate list is 0.

27.1, adding the ETMVP mode number 0 to the enhanced temporal candidate list, and increasing the length of the enhanced temporal candidate list by 1;

27.2, if My+8 is less than or equal to the smaller values of y_ctb_pos+lcu_size−cu_height and vertical_size−cu_height, and the motion information of position A1 is different from the motion information of position C3 or the motion information of position A2 is different from the motion information of position C4, then adding the ETMVP mode number 1 to the enhanced temporal candidate list and increasing the length of the enhanced temporal candidate list by 1;

27.3, if Mx+8 is less than or equal to the smaller values of x_ctb_pos+lcu_size−cu_width and horizontal_size− cu_width, and the motion information of position A1 is different from the motion information of position B2 or the motion information of position A3 is different from the motion information of position B4, then adding the ETMVP mode number 2 to the enhanced temporal candidate list and increasing the length of the enhanced temporal candidate list by 1;

27.4, if My−8 is greater than or equal to y_ctb_pos, and the motion information of position A3 is different from the motion information of position C1 or the motion information of position A4 is different from the motion information of position C2, then adding the ETMVP mode number 3 to the enhanced temporal candidate list and increasing the length of the enhanced temporal candidate list by 1;

27.5, if Mx−8 is greater than or equal to x_ctb_pos, and the motion information of position A2 is different from the motion information of position B1 or the motion information of position A4 is different from the motion information of position B3, then adding the ETMVP mode number 4 to the enhanced temporal candidate list and increasing the length of the enhanced temporal candidate list by 1.

27.6, if the length of the enhanced temporal candidate list is less than 5, performing the following operations in a loop:

27.6.1, adding another number in the enhanced temporal candidate list that is the same as the last ETMVP mode number in the list, and increasing the length of the enhanced temporal candidate list by 1;

27.6.2, if the length of the enhanced temporal candidate list equals 5, terminating the process of constructing the list.

Embodiment 28

28.0, initializing the length of the enhanced temporal candidate list to 0. For example, the initial length of the enhanced temporal candidate list is 0.

28.1, adding the ETMVP mode number 0 to the enhanced temporal candidate list, and increasing the length of the enhanced temporal candidate list by 1;

28.2, if My+8 is less than or equal to the smaller values of y_ctb_pos+lcu_size−cu_height and vertical_size−cu_height, and the motion information of position A1 is different from the motion information of position C3 or the motion information of position A2 is different from the motion information of position C4, then adding the ETMVP mode number 1 to the enhanced temporal candidate list and increasing the length of the enhanced temporal candidate list by 1;

28.3, if Mx+8 is less than or equal to the smaller values of x_ctb_pos+lcu_size−cu_width and horizontal_size−cu_width, and the motion information of position A1 is different from the motion information of position B2 or the motion information of position A3 is different from the motion information of position B4, then adding the ETMVP mode number 2 to the enhanced temporal candidate list and increasing the length of the enhanced temporal candidate list by 1;

28.4, if My−8 is greater than or equal to y_ctb_pos, and the motion information of position A3 is different from the motion information of position C1 or the motion information of position A4 is different from the motion information of position C2, then adding the ETMVP mode number 3 to the enhanced temporal candidate list and increasing the length of the enhanced temporal candidate list by 1;

28.5, if Mx−8 is greater than or equal to x_ctb_pos, and the motion information of position A2 is different from the motion information of position B1 or the motion information of position A4 is different from the motion information of position B3, then adding the ETMVP mode number 4 to the enhanced temporal candidate list and increasing the length of the enhanced temporal candidate list by 1.

Part 4, obtaining a corresponding ETMVP mode from the enhanced temporal candidate mode list according to the ETMVP mode index value, and determining coordinate information of a target matching CU corresponding to the ETMVP mode For example, obtain a corresponding ETMVP mode number (may be recorded as etmvp_mode) from the enhanced temporal candidate list according to the obtained ETMVP mode index value (may be recorded as EtmvpCandIndex), and according to the ETMVP mode number etmvp_mode, the coordinates of the target matching CU are determined to be (Px, Py). For example, etmvp_mode=EtmvpCandArray[EtmvpCandIndex].

Embodiment 29

According to the ETMVP mode number, the coordinates of the target matching CU, (Px, Py), are determined by looking up a table. For example, the correspondence between etmvp_mode and Px. Py can be seen in Table 2:

TABLE 2

| etmvp_mode | Px | Py |
| --- | --- | --- |
| 0 | Mx | My |
| 1 | Mx | My + n |
| 2 | Mx + n | My |
| 3 | Mx | My − n |
| 4 | Mx − n | My |

For example, n can be 8.

Embodiment 30

If the ETMVP mode number is 0, then the target matching CU is the initial matching CU, that is, Px equals Mx, Py equals My;

If the ETMVP mode number is 1, then the target matching CU is the temporal reference block obtained by the overall downward offset of the initial matching CU by n pixels, that is, Px equals Mx, Py equals My+n;

If the ETMVP mode number is 2, then the target matching CU is the temporal reference block obtained by the overall right offset of the initial matching CU by n pixels, that is, Px equals Mx+n, Py equals My;

If the ETMVP mode number is 3, then the target matching CU is the temporal reference block obtained by the overall upward offset of the initial matching CU by n pixels, that is, Px equals Mx, Py equals My−n.

If the ETMVP mode number is 4, then the target matching CU is the temporal reference block obtained by the overall left offset of the initial matching CU by n pixels, that is, Px equals Mx−n, Py equals My.

For example, n can be 8.

Part 5, obtaining motion information of each subblock in the current CU according to the coordinate information of the target matching CU For example, motion information of the target matching CU may be determined according to the coordinate information of the target matching CU, wherein the motion information of the target matching CU includes motion information of each subblock in the target matching CU, and motion information of a subblock at a corresponding position in the current CU is determined according to the motion information of each subblock in the target matching CU.

For example, a first surrounding block of the current CU may be seen in FIG. 5. As seen in FIG. 5, E is the current CU, and a first surrounding block of the current CU may include any one of A, B, C, D, F, and G.

For example, a CU includes at least one subblock, the width of each subblock does not exceed the width of the current CU, and the height of each subblock does not exceed the height of the current CU, for example, each subblock is an 8*8 block.

In an embodiment, the first surrounding block of the current CU is F in FIG. 5.

For example, for any subblock in the target matching CU (such as an 8*8 subblock), the upper-left corner coordinates of the of each 8*8 sub-block are (Px+(i<<<3), Py+(j<<3)), i is the horizontal index value of the subblock, j is the vertical index value of the subblock, i=0~(cu_width>>3)−1, j=0~(cu_height>>3)−1.

For example, for any subblock in the current CU (such as an 8*8 subblock), the motion information of each 8*8 subblock is MotionArray[i][j], i is the horizontal index value of the subblock, j is the vertical index value of the subblock, i=0~(cu_width>>3)−1, j=0~(cu_height>>3)−1.

Embodiment 31

For any subblock in the target matching CU:
31.1, if both the forward motion information and backward motion information of the subblock are available, the forward motion information and backward motion information of the subblock are scaled respectively to the first frame of List0 and the first frame of List1, and the scaled forward motion information and backward motion information are respectively given to the subblock at the corresponding position in the current CU;
31.2, if the forward motion information of the subblock is available, but the backward motion information is unavailable, the forward motion information of the subblock is scaled pointing to the first frame of List0, and the scaled forward motion information is given to the subblock at the corresponding position in the current CU;
31.3, if the backward motion information of the subblock is available, but the forward motion information is unavailable, the backward motion information of the subblock is scaled to the first frame of List1, and the scaled backward motion information is given to the subblock at the corresponding position in the current CU;
31.4, if neither forward motion information nor backward motion information for the subblock is available, then fill with default motion information.

For example, the default motion information may not be restricted in the embodiments of the present application. For example, the default motion information can be zero motion information or motion information determined from the surrounding blocks of the current CU.

Embodiment 32

For any subblock in the target matching CU:
32.1, if the forward motion information of the subblock is available, then the forward motion information of the subblock is scaled to the first frame of List0, and the scaled forward motion information is given to the subblock at the corresponding position in the current CU;
32.2, if the forward motion information is unavailable, then it is to be filled with default motion information.

For example, the default motion information may not be restricted in the embodiments of the present application. For example, the default motion information can be zero motion information or motion information determined from the surrounding blocks of the current CU.

Embodiment 33

For any subblock in the target matching CU:
33.1, when the current picture frame type is P picture:
33.1.1, if the forward motion information of the subblock is available, then the forward motion information of the subblock is scaled to the first frame of List0, and the scaled forward motion information is given to the subblock at the corresponding position in the current CU;
33.1.2, if the forward motion information is unavailable, then it is to be filled with default motion information.

For example, the default motion information may not be restricted in the embodiments of the present application. For example, the default motion information can be zero motion information or motion information determined from the surrounding blocks of the current CU.

33.2, when the current picture frame type is B picture:
33.2.1, if both the forward motion information and backward motion information of the subblock are available, the forward motion information and backward motion information of the subblock are scaled respectively to the first frame of List0 and the first frame of List1, and the scaled forward motion information and backward motion information are respectively given to the subblock at the corresponding position in the current CU;
33.2.2, if the forward motion information of the subblock is available, but the backward motion information is unavailable, the forward motion information of the subblock is scaled pointing to the first frame of List0, and the scaled forward motion information is given to the subblock at the corresponding position in the current CU;
33.2.3, if the backward motion information of the subblock is available, but the forward motion information is unavailable, the backward motion information of the subblock is scaled to the first frame of List1, and the scaled backward motion information is given to the subblock at the corresponding position in the current CU;
33.2.4, if neither forward motion information nor backward motion information for the subblock is available, then it is to be filled with default motion information.

For example, the default motion information may not be restricted in the embodiments of the present application. For example, the default motion information can be zero motion information or motion information determined from the surrounding blocks of the current CU.

Embodiment 34

For any subblock in the target matching CU:
34.1, if both the forward motion information and backward motion information of the subblock are available, the forward motion information and backward motion information of the subblock are scaled respectively to the first frame of List0 and the first frame of List1, and the scaled forward motion information and backward motion information are respectively given to the subblock at the corresponding position in the current CU;
34.2, if the forward motion information of the subblock is available, but the backward motion information is unavailable, the forward motion information of the subblock is scaled pointing to the first frame of List0, and the scaled forward motion information is given to the subblock at the corresponding position in the current CU;

34.3, if the backward motion information of the subblock is available, but the forward motion information is unavailable, the backward motion information of the subblock is scaled to the first frame of List1, and the scaled backward motion information is given to the subblock at the corresponding position in the current CU;

34.4, if neither forward motion information nor backward motion information for the subblock is available, then:

34.4.1, when both the forward motion information and backward motion information of the first surrounding block of the current CU are available, the forward motion information and backward motion information of the first surrounding block are scaled to the first frame of List0 and the first frame of List1 respectively, and the scaled forward motion information and scaled backward motion information are given to the subblock at the corresponding position in the current CU respectively;

34.4.2, when the forward motion information of the first surrounding block is available, but its backward motion information is unavailable, its forward motion information is scaled to the first frame of List0, and the scaled forward motion information is given to the subblock at the corresponding position in the current CU;

34.4.3, when the backward motion information of the first surrounding block is available, but its forward motion information is unavailable, its backward motion information is scaled to the first frame of List1, and the scaled backward motion information is given to the subblock at the corresponding position in the current CU;

34.4.4, when neither the forward motion information nor the backward motion information of the first surrounding block is available, the zero motion information is given to the subblock at the corresponding position in the current CU;

Embodiment 35

For any subblock in the target matching CU:

35.1, if the forward motion information of the subblock is available, then the forward motion information of the subblock is scaled to the first frame of List0, and the scaled forward motion information is given to the subblock at the corresponding position in the current CU;

35.2, if the forward motion information of the subblock is unavailable, then:

35.2.1, when the forward motion information of a first surrounding block of the current CU is available, the forward motion information of the first surrounding block is scaled to the first frame of List0, and the scaled forward motion information is given to the subblock at the corresponding position in the current CU;

35.2.2, when the forward motion information of the first surrounding block is unavailable, the zero motion information is given to the subblock at the corresponding position in the current CU.

Embodiment 36

For any subblock in the target matching CU:

36.1, when the current picture frame type is P picture:

36.1.1, if the forward motion information of the subblock is available, then the forward motion information of the subblock is scaled to the first frame of List0, and the scaled forward motion information is given to the subblock at the corresponding position in the current CU;

36.1.2, if the forward motion information of the subblock is unavailable, then:

36.1.2.1, when the forward motion information of a first surrounding block of the current CU is available, the forward motion information of the first surrounding block is scaled to the first frame of List0, and the scaled forward motion information is given to the subblock at the corresponding position in the current CU;

36.1.2.2, when the forward motion information of the first surrounding block is unavailable, the zero motion information is given to the subblock at the corresponding position in the current CU.

36.2, when the current picture frame type is B picture:

36.2.1, if both the forward motion information and backward motion information of the subblock are available, the forward motion information and backward motion information of the subblock are scaled respectively to the first frame of List0 and the first frame of List1, and the scaled forward motion information and backward motion information are respectively given to the subblock at the corresponding position in the current CU;

36.2.2, if the forward motion information of the subblock is available, but the backward motion information is unavailable, the forward motion information of the subblock is scaled pointing to the first frame of List0, and the scaled forward motion information is given to the subblock at the corresponding position in the current CU;

36.2.3, if the backward motion information of the subblock is available, but the forward motion information is unavailable, the backward motion information of the subblock is scaled to the first frame of List1, and the scaled backward motion information is given to the subblock at the corresponding position in the current CU;

36.2.4, if neither forward motion information nor backward motion information for the subblock is available, then:

36.2.4.1, when both the forward motion information and backward motion information of the first surrounding block of the current CU are available, the forward motion information and backward motion information of the first surrounding block are scaled to the first frame of List0 and the first frame of List1 respectively, and the scaled forward motion information and scaled backward motion information are given to the subblock at the corresponding position in the current CU respectively;

36.2.4.2, when the forward motion information of the first surrounding block is available, but its backward motion information is unavailable, its forward motion information is scaled to the first frame of List0, and the scaled forward motion information is given to the subblock at the corresponding position in the current CU;

36.2.4.3, when the backward motion information of the first surrounding block is available, but its forward motion information is unavailable, its backward motion information is scaled to the first frame of List1, and the scaled backward motion information is given to the subblock at the corresponding position in the current CU;

36.2.4.4, when neither the forward motion information nor the backward motion information of the first surrounding block is available, the zero motion information is given to the subblock at the corresponding position in the current CU.

Part 6, performing MC on the corresponding subblock in the current CU based on the motion information of each subblock in the current CU For example, a CU includes at least one subblock, the width of each subblock does not exceed the width of the current CU, and the height of each subblock does not exceed the height of the current CU.

For example, each subblock is an 8*8 block.

For example, for any subblock in the current CU (such as an 8*8 subblock), the motion information of each 8*8 subblock is MotionArray[i][j], i is the horizontal index value of the subblock, j is the vertical index value of the subblock, i=0~(cu_width>>3)−1, j=0~(cu_height>>3)−1.

Embodiment 37

For any subblock in the current CU, based on the motion information of the current subblock, motion compensation (MC) is performed on the current subblock, then the prediction sample matrix of the current subblock is obtained. For example, the prediction samples of the current CU are composed of prediction samples of each subblock.

Embodiment 38

For any subblock of the current CU, if the current subblock satisfies the application conditions of BIO, then based on the motion information of the current subblock, MC is performed on the current subblock, and BIO techniques are used to add the optical flow offset value to the compensated pixel value, then the prediction sample matrix of the current subblock is obtained; otherwise, based on the motion information of the current subblock, MC is performed on the current subblock, then the prediction sample matrix of the current subblock is obtained.

For example, the prediction samples of the current CU are composed of prediction samples of each subblock. For example, the subblock satisfies the application conditions of BIO, which includes:
1). according to sequence-level high-level syntax, BIO techniques is enabled;
2). the MV accuracy of the current CU equals 0;
3). the subblock uses bi-prediction;
4). for this subblock, the reference frame whose index value is refIdxL0 in the reference picture list 0 and the reference frame whose index value is refIdxL1 in the reference picture list 1 are respectively displayed on both sides of the current frame.

Embodiment 39

For any subblock of the current CU, DMVR is not used for its motion information. Based on the motion information of the current subblock, MC is performed on the current subblock. For example, the prediction samples of the current CU are composed of prediction samples of each subblock, then the prediction sample matrix of the current subblock is obtained.

Embodiment 40

For any subblock of the current CU, DMVR is not used for its motion information. If the current subblock satisfies the application conditions of BIO, then based on the motion information of the current subblock, MC is performed on the current subblock, and BIO techniques are used to add the optical flow offset value to the compensated pixel value, then the prediction sample matrix of the current subblock is obtained; otherwise, based on the motion information of the current subblock, MC is performed on the current subblock, then the prediction sample matrix of the current subblock is obtained.

For example, the prediction samples of the current CU are composed of prediction samples of each subblock, For example, the subblock satisfies the application conditions of BIO, which includes:
1). according to sequence-level high-level syntax, BIO techniques is enabled;
2). the MV accuracy of the current CU equals 0;
3). the subblock uses bi-prediction;
4). for this subblock, the reference frame whose index value is refIdxL0 in the reference picture list 0 and the reference frame whose index value is refIdxL1 in the reference picture list 1 are respectively displayed on both sides of the current frame.

It should be noted that, the above embodiments are only specific examples of the implementation method provided by the embodiments of the present application, and not a limitation on the protection scope of the present application. Based on the above embodiments, new embodiments may be obtained by combination, that is, any combination of two or more above embodiments, or modification of these above embodiments, and all of them shall fall within the protection scope of the present application.

In addition, the above embodiments can refer to each other, and the implementation process of encoding and decoding of the above embodiments can refer to each other.

Figure 7:
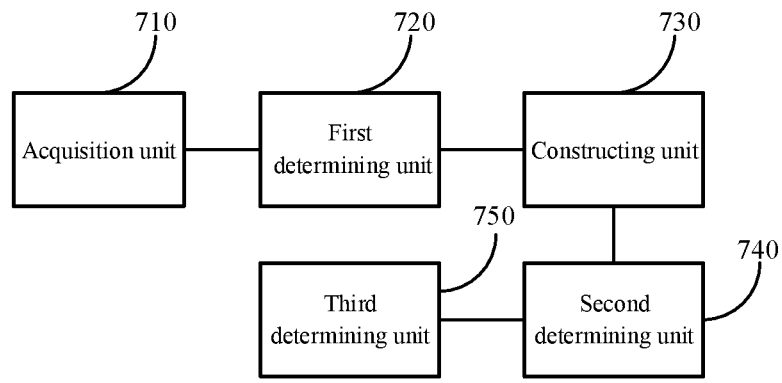
FIG. 7 is a structure diagram of a decoding apparatus according to an embodiment of the present application.

The above is a description of the methods provided by the present application. The following is a description of the apparatuses provided by the present application:

Please see FIG. 7. It is a structure diagram of a decoding apparatus according to the embodiments of the present application, wherein the apparatus may include: an acquisition unit 710, configured to obtain a value of an ETMVP mode flag and an ETMVP mode index value for a current CU; a first determining unit 720, configured to determine coordinate information of an initial matching CU of the current CU according to coordinate information of the current CU when the value of the ETMVP mode flag is a first value; a constructing unit 730, configured to construct an enhanced temporal candidate list based on the coordinate information of the initial matching CU; a second determining unit 740, configured to obtain a corresponding ETMVP mode number from the enhanced temporal candidate list according to the ETMVP mode index value, and determine coordinate information of a target matching CU corresponding to the ETMVP mode number; a third determining unit 750, configured to determine motion information of the target matching CU according to the coordinate information of the target matching CU, wherein the motion information of the target matching CU comprises motion information of each subblock in the target matching CU, and determine motion information of a subblock at a corresponding position in the current CU according to the motion information of each subblock in the target matching CU.

In some embodiments, the acquisition unit 710 obtains a value of the ETMVP mode flag for a current CU, which includes: when the current CU satisfies a first parsing condition, the value of the ETMVP mode flag is parsed from a bitstream; otherwise, the value of the ETMVP mode flag is determined as a second value; wherein, if the value of the ETMVP mode flag is the first value, it indicates that the current CU enables an ETMVP mode; if the value of the ETMVP mode flag is the second value, it indicates that the current CU disables the ETMVP mode.

In some embodiments, the current CU satisfies a first parsing condition, which may include one or more of the following: a prediction mode of the current CU is skip mode or direct mode; the current CU has a size satisfying the preset size limit; according to sequence-level high-level syntax, the current CU enables ETMVP techniques; the current CU satisfies a condition for using AWP or a condition for using UMVE.

In some embodiments, the current CU satisfies a first parsing condition, which includes: a prediction mode of the current CU is skip mode or direct mode; the current CU has a size satisfying the preset size limit; the current CU has a width and a height which both are greater than or equal to NO; according to sequence-level high-level syntax, the current CU enables ETMVP techniques; the current CU satisfies a condition for AWP or a condition for using UMVE.

In some embodiments, the ETMVP mode flag is encoded by CABAC with a context model.

In some embodiments, the acquisition unit 710 obtains a value of the ETMVP mode flag for a current CU, which includes: when the current CU satisfies a second parsing condition, the value of the ETMVP mode flag is parsed from a bitstream.

In some embodiments, the current CU satisfies a second parsing condition, which may include one or more of the following: a prediction mode of the current CU is skip mode or direct mode; the current CU enables the ETMVP mode.

In some embodiments, an inverse binarization of the ETMVP mode index value is realized based on a Truncated Unary with a maximum value of 4, wherein the Truncated Unary uses a bin string of up to 4 bins and each of the bins and each of the bin symbols adopts a separate context model, so there are four context models in total.

In some embodiments, the first determining unit 720 determines coordinate information of an initial matching CU of the current CU according to coordinate information of the current CU, which includes: determining a temporal reference picture where the matching CU is located according to the current picture frame type; determining the coordinate information of the initial matching CU in the temporal reference picture according to the coordinate information of the current CU; wherein if the current picture frame type is P picture, the temporal reference picture is in the reference picture list 0, and its reference frame index value is 0; if the current picture frame type is B picture, the temporal reference picture is in the reference picture list 1, and its reference frame index value is 0.

In some embodiments, the first determining unit 720 determines the coordinate information of the initial matching CU in the temporal reference picture according to the coordinate information of the current CU, which includes: determining the coordinate information of the initial matching CU according to the upper-left corner coordinate of the current LCU, the LCU size, the current picture size, the current CU size, and the upper-left corner coordinate of the current CU in the picture.

In some embodiments, the first determining unit 720 determines the coordinate information of the initial matching CU according to the upper-left corner coordinate of the current LCU, the LCU size, the current picture size, the current CU size, and the upper-left corner coordinate of the current CU in the picture, which includes: determining the initial matching CU's abscissa according to the current LCU's upper-left corner abscissa in the picture, the LCU size, the width of the current CU, the width of the current picture, and the current CU's upper-left corner abscissa in the picture; determining the initial matching CU's ordinate according to the current LCU's upper-left corner ordinate in the picture, the LCU size, the height of the current CU, the height of the current picture, and the current CU's upper-left corner ordinate in the picture.

In some embodiments, the constructing unit 730 constructs an enhanced temporal candidate list based on the coordinate information of the initial matching CU, which includes: determining at least one ETMVP mode number according to the coordinate information of the initial matching CU; constructing an enhanced temporal candidate list, according to the at least one ETMVP mode number.

In some embodiments, the coordinate information of the matching CU is the upper-left corner coordinate of the matching CU in the temporal reference picture; as mentioned above, constructing an enhanced temporal candidate list according to the at least one ETMVP mode number may include:

adding the ETMVP mode number 0 to the enhanced temporal candidate list, and increasing the length of the enhanced temporal candidate list by 1;

if My+8 is less than or equal to the smaller values of y_ctb_pos+lcu_size−cu_height and vertical_size−cu_height, and the motion information of position A1 is different from the motion information of position C3 or the motion information of position A2 is different from the motion information of position C4, then adding the ETMVP mode number 1 to the enhanced temporal candidate list and increasing the length of the enhanced temporal candidate list by 1;

if Mx+8 is less than or equal to the smaller values of x_ctb_pos+lcu_size−cu_width and horizontal_size−cu_width, and the motion information of position A1 is different from the motion information of position B2, or the motion information of position A3 is different from the motion information of position B4, then adding the ETMVP mode number 2 to the enhanced temporal candidate list and increasing the length of the enhanced temporal candidate list by 1;

if My−8 is greater than or equal to y_ctb_pos, and the motion information of position A3 is different from the motion information of position C1, or the motion information of position A4 is different from the motion information of position C2, then adding the ETMVP mode number 3 to the enhanced temporal candidate list and increasing the length of the enhanced temporal candidate list by 1;

if Mx−8 is greater than or equal to x_ctb_pos, and the motion information of position A2 is different from the motion information of position B1 or the motion information of position A4 is different from the motion information of position B3, then adding the ETMVP mode number 4 to the enhanced temporal candidate list and increasing the length of the enhanced temporal candidate list by 1;

wherein (Mx, My) is the coordinate information of the initial matching CU, (x_ctb_pos, y_ctb_pos) is the upper-left corner coordinate of the current LCU in the picture, lcu_size is the size of the LCU, the cu_width and cu_height are the width and height of the current CU respectively, and the horizontal_size and vertical_size are the width and height of the current picture respectively;

A1 is the 4*4 block in the upper-left corner of the initial matching CU, B1 is the 4*4 block directly to the left of A1, and C1 is the 4*4 block directly above A1; A2 is the 4*4 block in the upper-right corner of the initial matching CU, B2 is the 4*4 block directly to the right of A2, and C2 is the 4*4 block directly above A2; A3 is the 4*4 block in the lower-left corner of the initial matching CU, B3 is the 4*4 block directly to the left of A3, and C3 is the 4*4 block directly below A3; A4 is the 4*4 block in the lower-right corner of the initial matching CU, B4 is the 4*4 block directly to the right of A4, and C4 is the 4*4 block directly below A4.

In some embodiments, the constructing unit 730 constructs an enhanced temporal candidate list based on the coordinate information of the initial matching CU, which also includes: when the length of the enhanced temporal candidate list is less than 5, performing the following operations in a loop until the length of the enhanced temporal candidate list equals 5: adding another number in the enhanced temporal candidate list that is the same as the last ETMVP mode number in the list, and increasing the length of the enhanced temporal candidate list by 1.

In some embodiments, the second determining unit 740 obtains a corresponding ETMVP mode number from the enhanced temporal candidate list according to the ETMVP mode index value, and determines coordinate information of a target matching CU corresponding to the ETMVP mode number, which includes:

if the ETMVP mode number is 0, then Px equals Mx, Py equals My;
if the ETMVP mode number is 1, then Px equals Mx, Py equals My+n;
if the ETMVP mode number is 2, then Px equals Mx+n, Py equals My;
if the ETMVP mode number is 3, then Px equals Mx, Py equals My−n;
if the ETMVP mode number is 4, then Px equals Mx−n, Py equals My;
wherein (Mx, My) is the upper-left corner coordinate of the initial matching CU, and (Px, Py) is the upper-left corner coordinate of the target matching CU.

In some embodiments, the third determining unit 750 determines motion information of a subblock at a corresponding position in the current CU according to the motion information of each subblock in the target matching CU, which includes: for any subblock in the target matching CU, when the current picture frame type is P picture, if the forward motion information of the subblock is available, then the forward motion information of the subblock is scaled to the first frame of List0, and the scaled forward motion information is given to the subblock at the corresponding position in the current CU.

In some embodiments, the third determining unit 750 determines motion information of a subblock at a corresponding position in the current CU according to the motion information of each subblock in the target matching CU, which includes: for any subblock in the target matching CU, when the current picture frame type is B picture, if the forward motion information and backward motion information of the subblock are available, the forward motion information and backward motion information of the subblock are scaled respectively, pointing to the first frame of List0 and the first frame of List1, and the scaled forward motion information and backward motion information are respectively given to the subblock at the corresponding position in the current CU; if the forward motion information of the subblock is available, but the backward motion information is unavailable, the forward motion information of the subblock is scaled pointing to the first frame of List0, and the scaled forward motion information is given to the subblock at the corresponding position in the current CU; if the backward motion information of the subblock is available, but the forward motion information is unavailable, the backward motion information of the subblock is scaled pointing to the first frame of List1, and the scaled backward motion information is given to the subblock at the corresponding position in the current CU.

In some embodiments, the third determining unit 750 determines motion information of a subblock at a corresponding position in the current CU according to the motion information of each subblock in the target matching CU, which includes: for any subblock in the target matching CU, when the current picture frame type is P picture, if the forward motion information of the subblock is unavailable, when the forward motion information of the first surrounding block of the current CU is available, the forward motion information of the first surrounding block is scaled to the first frame of List0, and the scaled forward motion information is given to the subblock at the corresponding position in the current CU; when the forward motion information of the first surrounding block is unavailable, the zero motion information is given to the subblock at the corresponding position in the current CU; when the current picture frame type is B picture, if neither the forward motion information nor backward motion information of the subblock is available, when both the forward motion information and backward motion information of the first surrounding block of the current CU are available, the forward motion information and backward motion information of the first surrounding block are scaled to the first frame of List0 and the first frame of List1 respectively, and the scaled forward motion information and scaled backward motion information are given to the subblock at the corresponding position in the current CU respectively; when the forward motion information of the first surrounding block is available, but its backward motion information is unavailable, its forward motion information is scaled to the first frame of List0, and the scaled forward motion information is given to the subblock at the corresponding position in the current CU; when the backward motion information of the first surrounding block is available, but its forward motion information is unavailable, its backward motion information is scaled to the first frame of List1, and the scaled backward motion information is given to the subblock at the corresponding position in the current CU; when neither the forward motion information nor the backward motion information of the first surrounding block is available, the zero motion information is given to the subblock at the corresponding position in the current CU. Wherein the first surrounding block comprises any decoded neighboring block of the current CU.

Figure 8:
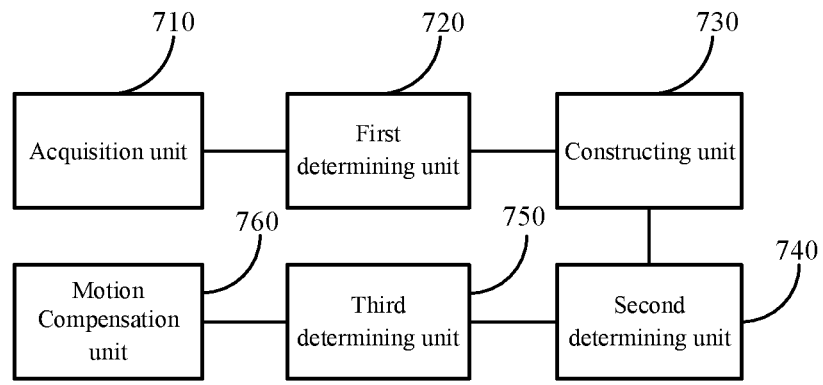
FIG. 8 is a structure diagram of another decoding apparatus according to an embodiment of the present application.

In some embodiments, as seen in FIG. 8, the decoding apparatus also includes: a motion compensation (MC) unit 760, configured to perform MC on the corresponding subblock in the current CU according to the motion information of each subblock in the current CU.

In some embodiments, the MC unit 760 performs MC on the corresponding subblock in the current CU according to the motion information of each subblock in the current CU, which includes: for any subblock of the current CU, not using DMVR for its motion information; if the subblock satisfies the application conditions of BIO, MC is performed on the subblock according to the motion information of the subblock, and BIO techniques are used to add the optical flow offset value to the compensated pixel value, then the prediction sample matrix of the subblock is obtained; otherwise, performing MC on the subblock according to the motion information of the subblock, and obtaining the prediction sample matrix of the subblock; wherein the prediction samples of the current CU are composed of prediction samples of each subblock.

In a possible embodiment, the decoding apparatus mentioned above may include a video decoder.

Figure 9:
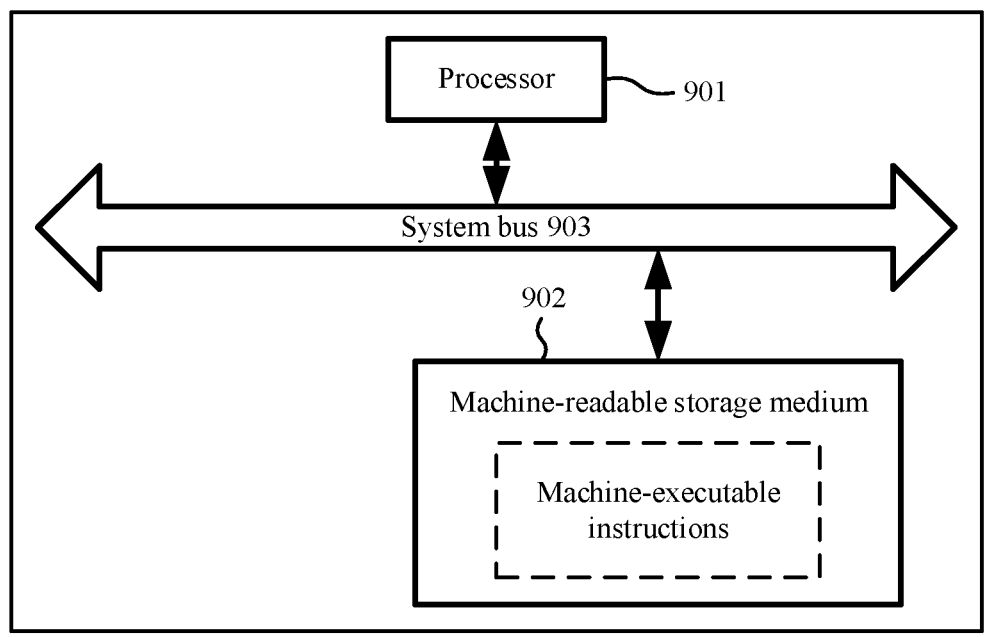
FIG. 9 is a hardware structure diagram of a decoding device according to an embodiment of the present application.

Please see FIG. 9. It is a hardware structure diagram of a decoding device provided by the embodiments of the present application. The decoding device may include a processor 901, and a machine-readable storage medium 902 that stores machine-executable instructions. The processor 901 and the machine-readable storage medium 902 may communicate via the system bus 903. In addition, by reading and executing the machine-executable instructions corresponding to decoding control logic, which is stored in the machine-readable storage medium 902, the processor 901 can execute the decoding method described above.

The machine-readable storage medium 902 mentioned herein may be any electronic, magnetic, optical or other physical storage device, which may contain or store information, such as executable instructions, data, etc. For example, a machine-readable storage medium may be: RAM (Radom Access Memory), volatile memory, non-volatile memory, flash memory, storage drives (such as hard disk drives), solid-state drives, any type of storage disk (such as optical disks, DVDs, etc.), similar storage media, or a combination thereof.

In some embodiments, a machine-readable storage medium is provided, which stores machine-executable instructions, and the machine-executable instructions are executed by the processor to implement the decoding method described above. For example, the machine-readable storage medium may be ROM, RAM, CD-ROM, tapes, soft disks, optical data storage devices, etc.

Figure 10:
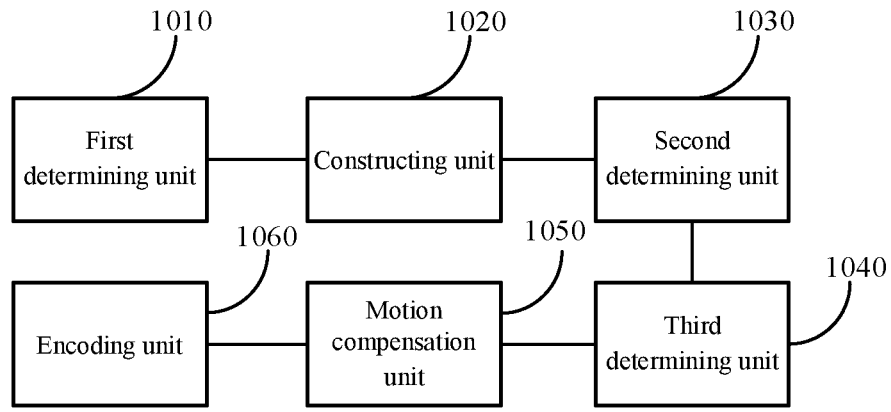
FIG. 10 is a structure diagram of an encoding apparatus according to an embodiment of the present application.

Please see FIG. 10. It is a structure diagram of an encoding apparatus provided by the embodiments of the present application, and the apparatus may include: a first determining unit 1010, configured to determine coordinate information of an initial matching CU of a current CU according to coordinate information of the current CU; a constructing unit 1020, configured to construct an enhanced temporal candidate list based on the coordinate information of the initial matching CU; a second determining unit 1030, configured to determine coordinate information of a target matching CU corresponding to each ETMVP mode number in the enhanced temporal candidate list by going through ETMVP mode numbers in the enhanced temporal candidate list sequentially; a third determining unit 1040, configured to determine motion information of the target matching CU according to the coordinate information of the target matching CU, wherein the motion information of the target matching CU comprises motion information of each subblock in the target matching CU, and determine motion information of a subblock at a corresponding position in the current CU according to the motion information of each subblock in the target matching CU; a MC unit 1050, configured to perform MC on the corresponding subblock in the current CU according to the motion information of each subblock in the current CU; an encoding unit 1060, configured to calculate a rate-distortion cost corresponding to an ETMVP mode, compare the rate-distortion cost with respective rate-distortion costs of other prediction modes, selecte a prediction mode corresponding to a smallest rate-distortion cost, and then record an ETMVP mode flag and an ETMVP mode index value of the selected ETMVP mode into a bitstream to be transmitted to a decoding device.

In some embodiments, the first determining unit 1010 determines coordinate information of an initial matching CU of the current CU according to coordinate information of the current CU, which includes: determining a temporal reference picture where the matching CU is located according to the current picture frame type; determining the coordinate information of the initial matching CU in the temporal reference picture according to the coordinate information of the current CU; wherein if the current picture frame type is P picture, the temporal reference picture is in the reference picture list 0, and its reference frame index value is 0; if the current picture frame type is B picture, the temporal reference picture is in the reference picture list 1, and its reference frame index value is 0.

In some embodiments, the first determining unit 1010 determines the coordinate information of the initial matching CU in the temporal reference picture according to the coordinate information of the current CU, which includes: determining the coordinate information of the initial matching CU according to the upper-left corner coordinate of the current LCU, the LCU size, the current picture size, the current CU size, and the upper-left corner coordinate of the current CU in the picture.

In some embodiments, the first determining unit 1010 determines the coordinate information of the initial matching CU according to the upper-left corner coordinate of the current LCU, the LCU size, the current picture size, the current CU size, and the upper-left corner coordinate of the current CU in the picture, which includes: determining the initial matching CU's abscissa according to the current LCU's upper-left corner abscissa in the picture, the LCU size, the width of the current CU, the width of the current picture, and the current CU's upper-left corner abscissa in the picture; determining the initial matching CU's ordinate according to the current LCU's upper-left corner ordinate in the picture, the LCU size, the height of the current CU, the height of the current picture, and the current CU's upper-left corner ordinate in the picture.

In some embodiments, the constructing unit 1020 constructs an enhanced temporal candidate list based on the coordinate information of the initial matching CU, which includes: determining at least one ETMVP mode number according to the coordinate information of the initial matching CU; constructing an enhanced temporal candidate list, according to the at least one ETMVP mode number.

In some embodiments, the coordinate information of the matching CU is the upper-left corner coordinate of the matching CU in the temporal reference picture; the constructing unit 1020 constructs an enhanced temporal candidate list, according to the at least one ETMVP mode number, which includes:

adding the ETMVP mode number 0 to the enhanced temporal candidate list, and increasing the length of the enhanced temporal candidate list by 1;

if My+8 is less than or equal to the smaller values of y_ctb_pos+lcu_size−cu_height and vertical_size−cu_height, and the motion information of position A1 is different from the motion information of position C3 or the motion information of position A2 is different from the motion information of position C4, then adding the ETMVP mode number 1 to the enhanced temporal candidate list, increasing the length of the enhanced temporal candidate list by 1;

if Mx+8 is less than or equal to the smaller values of x_ctb_pos+lcu_size−cu_width and horizontal_size−cu_width, and the motion information of position A1 is different from the motion information of position B2 or the motion information of position A3 is different from the motion information of position B4, then adding the ETMVP mode number 2 to the enhanced temporal candidate list and increasing the length of the enhanced temporal candidate list by 1;

if My−8 is greater than or equal to y_ctb_pos, and the motion information of position A3 is different from the motion information of position C1, or the motion information of position A4 is different from the motion information of position C2, then adding the ETMVP mode number 3 to the enhanced temporal candidate list and increasing the length of the enhanced temporal candidate list by 1;

if Mx−8 is greater than or equal to x_ctb_pos, and the motion information of position A2 is different from the motion information of position B1, or the motion information of position A4 is different from the motion information of position B3, then adding the ETMVP mode number 4 to the enhanced temporal candidate list and increasing the length of the enhanced temporal candidate list by 1;

wherein (Mx, My) is the coordinate information of the initial matching CU, (x_ctb_pos, y_ctb_pos) is the upper-left corner coordinate of the current LCU in the picture, lcu_size is the size of the LCU, the cu_width and cu_height are the width and height of the current CU respectively, and the horizontal_size and vertical_size are the width and height of the current picture respectively;

A1 is the 4*4 block in the upper-left corner of the initial matching CU, B1 is the 4*4 block directly to the left of A1, and C1 is the 4*4 block directly above A1; A2 is the 4*4 block in the upper-right corner of the initial matching CU, B2 is the 4*4 block directly to the right of A2, and C2 is the 4*4 block directly above A2; A3 is the 4*4 block in the lower-left corner of the initial matching CU, B3 is the 4*4 block directly to the left of A3, and C3 is the 4*4 block directly below A3; A4 is the 4*4 block in the lower-right corner of the initial matching CU, B4 is the 4*4 block directly to the right of A4, and C4 is the 4*4 block directly below A4.

In some embodiments, the constructing unit 1020 constructs an enhanced temporal candidate list based on the coordinate information of the initial matching CU, which also includes: when the length of the enhanced temporal candidate list is less than 5, performing the following operations in a loop until the length of the enhanced temporal candidate list equals 5: adding another number in the enhanced temporal candidate list that is the same as the last ETMVP mode number in the list, and increasing the length of the enhanced temporal candidate list by 1.

In some embodiments, the second determining unit 1030 determines coordinate information of a target matching CU corresponding to each ETMVP mode number in the enhanced temporal candidate list by going through ETMVP mode numbers in the enhanced temporal candidate list sequentially, which includes: for each ETMVP mode number in the enhanced temporal candidate list which is being gone through, if the ETMVP mode number is 0, then Px equals Mx, Py equals My;

if the ETMVP mode number is 1, then Px equals Mx, Py equals My+n;

if the ETMVP mode number is 2, then Px equals Mx+n, Py equals My;

if the ETMVP mode number is 3, then Px equals Mx, Py equals My−n;

if the ETMVP mode number is 4, then Px equals Mx−n, Py equals My;

Wherein (Mx, My) is the upper-left corner coordinate of the initial matching CU, and (Px, Py) is the upper-left corner coordinate of the target matching CU.

In some embodiments, the third determining unit 1040 determines motion information of a subblock at a corresponding position in the current CU according to the motion information of each subblock in the target matching CU, which includes: for any subblock in the target matching CU, when the current picture frame type is P picture, if the forward motion information of the subblock is available, then the forward motion information of the subblock is scaled to the first frame of List0, and the scaled forward motion information is given to the subblock at the corresponding position in the current CU.

In some embodiments, the third determining unit 1040 determines motion information of a subblock at a corresponding position in the current CU according to the motion information of each subblock in the target matching CU, which includes: for any subblock in the target matching CU, when the current picture frame type is B picture, if the forward motion information and backward motion information of the subblock are available, the forward motion information and backward motion information of the subblock are scaled respectively, pointing to the first frame of List0 and the first frame of List1, and the scaled forward motion information and backward motion information are respectively given to the subblock at the corresponding position in the current CU; if the forward motion information of the subblock is available, but the backward motion information is unavailable, the forward motion information of the subblock is scaled pointing to the first frame of List0, and the scaled forward motion information is given to the subblock at the corresponding position in the current CU; if the backward motion information of the subblock is available, but the forward motion information is unavailable, the backward motion information of the subblock is scaled pointing to the first frame of List1, and the scaled backward motion information is given to the subblock at the corresponding position in the current CU.

If neither the forward motion information nor backward motion information of the subblock is available, when both the forward motion information and backward motion information of the first surrounding block of the current CU are available, the forward motion information and backward motion information of the first surrounding block are scaled to the first frame of List0 and the first frame of List1 respectively, and the scaled forward motion information and scaled backward motion information are given to the subblock at the corresponding position in the current CU respectively; when the forward motion information of the first surrounding block is available, but its backward motion information is unavailable, its forward motion information is scaled to the first frame of List0, and the scaled forward motion information is given to the subblock at the corresponding position in the current CU; when the backward motion information of the first surrounding block is available, but its forward motion information is unavailable, its backward motion information is scaled to the first frame of List1, and the scaled backward motion information is given to the subblock at the corresponding position in the current CU; when neither the forward motion information nor the backward motion information of the first surrounding block is available, the zero motion information is given to the subblock at the corresponding position in the current CU;

In some embodiments, the MC unit 1050 performs MC on the corresponding subblock in the current CU according to the motion information of each subblock in the current CU, which includes: for any subblock of the current CU, not using DMVR for its motion information; if the subblock satisfies the application conditions of BIO, MC is performed on the subblock according to the motion information of the subblock, and BIO techniques are used to add the optical flow offset value to the compensated pixel value, then the prediction sample matrix of the subblock is obtained; otherwise, performing MC on the subblock according to the motion information of the subblock, and obtaining the prediction sample matrix of the subblock; wherein the prediction samples of the current CU are composed of prediction samples of each subblock.

In a possible embodiment, the encoding apparatus mentioned above may include a video encoder.

Figure 11:
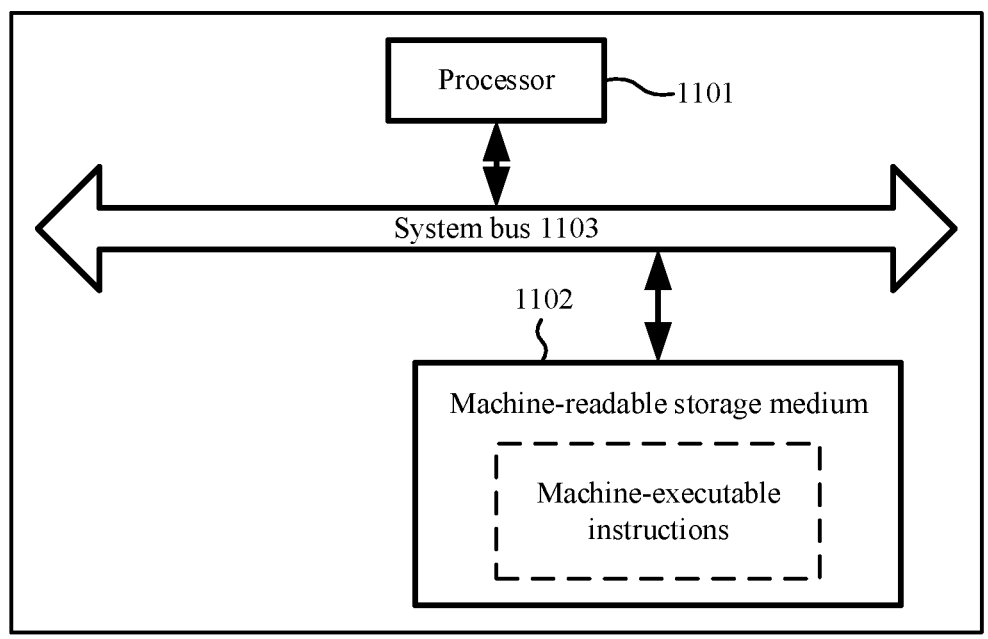
FIG. 11 is a hardware structure diagram of an encoding device according to an embodiment of the present application.

Please see FIG. 11. It is a hardware structure diagram of an encoding device provided by the embodiments of the present application. The encoding device includes a processor 1101 and a machine-readable storage medium 1102 that stores machine-executable instructions. The processor 1101 and the machine-readable storage medium 1102 may communicate via the system bus 1103. In addition, by reading and executing the machine-executable instructions corresponding to encoding control logic, which is stored in the machine-readable storage medium 1102, the processor 1101 can execute the encoding method described above.

The machine-readable storage medium 1102 mentioned herein may be any electronic, magnetic, optical or other physical storage device, which may contain or store information, such as executable instructions, data, etc. For example, a machine-readable storage medium may be: RAM (Radom Access Memory), volatile memory, non-volatile memory, flash memory, storage drives (such as hard disk drives), solid-state drives, any type of storage disk (such as optical disks, DVDs, etc.), similar storage media, or a combination thereof.

In some embodiments, a machine-readable storage medium is provided, which stores machine-executable instructions, and the machine-executable instructions are executed by the processor to implement the encoding method described above. For example, the machine-readable storage medium may be ROM, RAM, CD-ROM, tapes, soft disks, optical data storage devices, etc.

In some embodiments, a camera device is also provided, which includes encoding apparatus in any of the above embodiments and decoding apparatus in any of the above embodiments.

It should be noted that, in the present application, relational terms such as first and second are only used to distinguish an entity or operation from another entity or operation, and do not necessarily require or imply any such actual relationship or order between these entities or operations. In addition, the term "including", "comprising" or any other variation thereof is intended to cover non-exclusive inclusions so that a process, method, article or apparatus including a series of elements includes not only those elements, but also other elements not expressly listed, or elements inherent in such process, method, article or equipment. In the absence of further restrictions, the elements qualified by the statement "including(comprising) a/an . . . " do not exclude the existence of other identical elements in the process, method, article or apparatus that include the elements.

The above description is only better embodiments of the present application and not intended to limit the present application. Any modification, equivalent replacement, improvement, etc. made within the spirit and principle of the present application shall be included in the protection scope of the present application.

The invention claimed is:

1. A decoding method comprises:
    obtaining a value of an Enhanced Temporal Motion Vector Prediction (ETMVP) mode flag and an ETMVP mode index value for a current coding unit (CU);
    when the value of the ETMVP mode flag is a first value:
        determining coordinate information of an initial matching CU of the current CU according to coordinate information of the current CU;
        constructing an enhanced temporal candidate list based on the coordinate information of the initial matching CU;
        obtaining a corresponding ETMVP mode number from the enhanced temporal candidate list according to the ETMVP mode index value, and determining coordinate information of a target matching CU corresponding to the ETMVP mode number;
        determining motion information of the target matching CU according to the coordinate information of the target matching CU, wherein the motion information of the target matching CU comprises motion information of each subblock in the target matching CU, and determining motion information of a subblock at a corresponding position in the current CU according to the motion information of each subblock in the target matching CU.

2. The method according to claim 1, wherein obtaining the value of the ETMVP mode flag for the current CU, comprises:
    when the current CU satisfies a first parsing condition, parsing the value of the ETMVP mode flag from a bitstream;
    otherwise, determining the value of the ETMVP mode flag as a second value;
    wherein, if the value of the ETMVP mode flag is the first value, it indicates that the current CU enables an ETMVP mode;
    if the value of the ETMVP mode flag is the second value, it indicates that the current CU disables the ETMVP mode.

3. The method according to claim 2, wherein the ETMVP mode flag is encoded by Context-based Adaptive Binary Arithmetic Coding (CABAC) with a context model.

4. The method according to claim 1, wherein, obtaining the ETMVP mode index value for the current CU, comprises:
    when the current CU satisfies a second parsing condition, parsing the ETMVP mode index value from a bitstream.

5. The method according to claim 4, wherein the current CU satisfies the second parsing condition, comprises one or more of:
    a prediction mode of the current CU is skip mode or direct mode;
    the current CU enables the ETMVP mode.

6. The method according to claim 5, wherein an inverse binarization of the ETMVP mode index value is realized based on a Truncated Unary with a maximum value of 4, wherein the Truncated Unary uses a bin string of up to 4 bins and each of the bins adopts a separate context model, so there are four context models in total.

7. The method according to claim 1, wherein constructing an enhanced temporal candidate list based on the coordinate information of the initial matching CU, comprises:

determining at least one ETMVP mode number according to the coordinate information of the initial matching CU;

constructing an enhanced temporal candidate list, according to the at least one ETMVP mode number.

8. The method according to claim 7, wherein the coordinate information of the matching CU is the upper-left corner coordinate of the matching CU in the temporal reference picture;

constructing an enhanced temporal candidate list, according to the at least one ETMVP mode number, comprises:

adding the ETMVP mode number 0 to the enhanced temporal candidate list, and increasing the length of the enhanced temporal candidate list by 1;

if My+8 is less than or equal to the smaller values of y_ctb_pos+lcu_size−cu_height and vertical_size−cu_height, and the motion information of position A1 is different from the motion information of position C3 or the motion information of position A2 is different from the motion information of position C4, then adding the ETMVP mode number 1 to the enhanced temporal candidate list, and increasing the length of the enhanced temporal candidate list by 1;

if Mx+8 is less than or equal to the smaller values of x_ctb_pos+lcu_size−cu_width and horizontal_size−cu_width, and the motion information of position A1 is different from the motion information of position B2 or the motion information of position A3 is different from the motion information of position B4, then adding the ETMVP mode number 2 to the enhanced temporal candidate list, and increasing the length of the enhanced temporal candidate list by 1;

if My−8 is greater than or equal to y_ctb_pos, and the motion information of position A3 is different from the motion information of position C1 or the motion information of position A4 is different from the motion information of position C2, then adding the ETMVP mode number 3 to the enhanced temporal candidate list and increasing the length of the enhanced temporal candidate list by 1;

if Mx−8 is greater than or equal to x_ctb_pos, and the motion information of position A2 is different from the motion information of position B1 or the motion information of position A4 is different from the motion information of position B3, then adding the ETMVP mode number 4 to the enhanced temporal candidate list and increasing the length of the enhanced temporal candidate list by 1;

wherein (Mx, My) is the coordinate information of the initial matching CU, (x_ctb_pos, y_ctb_pos) is the upper-left corner coordinate of the current LCU in the picture, lcu_size is the size of the LCU, the cu_width and cu_height are the width and height of the current CU, and the horizontal_size and vertical_size are the width and height of the current picture, respectively;

A1 is the 4*4 block in the upper-left corner of the initial matching CU, B1 is the 4*4 block directly to the left of A1, and C1 is the 4*4 block directly above A1; A2 is the 4*4 block in the upper-right corner of the initial matching CU, B2 is the 4*4 block directly to the right of A2, and C2 is the 4*4 block directly above A2; A3 is the 4*4 block in the lower-left corner of the initial matching CU, B3 is the 4*4 block directly to the left of A3, and C3 is the 4*4 block directly below A3; A4 is the 4*4 block in the lower-right corner of the initial matching CU, B4 is the 4*4 block directly to the right of A4, and C4 is the 4*4 block directly below A4.

9. The method according to claim 8, wherein constructing an enhanced temporal candidate list based on the coordinate information of the initial matching CU, also comprises:

when the length of the enhanced temporal candidate list is less than 5, performing the following operations in a loop until the length of the enhanced temporal candidate list equals to 5:

adding another number in the enhanced temporal candidate list that is the same as the last ETMVP mode number in the list, and increasing the length of the enhanced temporal candidate list by 1.

10. The method according to claim 1, wherein determining motion information of a subblock at a corresponding position in the current CU according to the motion information of each subblock in the target matching CU, comprises:

for any subblock in the target matching CU:

when the current picture frame type is P picture:

if the forward motion information of the subblock is available, then the forward motion information of the subblock is scaled to the first frame of List0, and the scaled forward motion information is given to the subblock at the corresponding position in the current CU.

11. The method according to claim 1, wherein determining motion information of a subblock at a corresponding position in the current CU according to the motion information of each subblock in the target matching CU, comprises:

for any subblock in the target matching CU:

when the current picture frame type is B picture:

if the forward motion information and backward motion information of the subblock are available, the forward motion information and backward motion information of the subblock are scaled respectively, pointing to the first frame of List0 and the first frame of List1, and the scaled forward motion information and backward motion information are respectively given to the subblock at the corresponding position in the current CU;

if the forward motion information of the subblock is available, but the backward motion information is unavailable, the forward motion information of the subblock is scaled pointing to the first frame of List0, and the scaled forward motion information is given to the subblock at the corresponding position in the current CU;

if the backward motion information of the subblock is available, but the forward motion information is unavailable, the backward motion information of the subblock is scaled pointing to the first frame of List1, and the scaled backward motion information is given to the subblock at the corresponding position in the current CU.

12. The method according to claim 1, wherein determining the motion information of the subblock at the corresponding position in the current CU according to the motion information of each subblock in the target matching CU, comprises:

for any subblock in the target matching CU:

when the current picture frame type is P picture:

if the forward motion information of the subblock is unavailable, when the forward motion information of the first surrounding block of the current CU is available, the forward motion information of the first surrounding block is scaled to the first frame of List0, and the scaled forward motion information is given to the subblock at the corresponding position in the current CU; when the forward motion information of the first surrounding block is unavailable, the zero motion information is given to the subblock at the corresponding position in the current CU;

when the current picture frame type is B picture:

if neither the forward motion information nor backward motion information of the subblock is available, when both the forward motion information and backward motion information of the first surrounding block of the current CU are available, the forward motion information and backward motion information of the first surrounding block are scaled to the first frame of List0 and the first frame of List1 respectively, and the scaled forward motion information and scaled backward motion information are given to the subblock at the corresponding position in the current CU respectively; when the forward motion information of the first surrounding block is available, but its backward motion information is unavailable, its forward motion information is scaled to the first frame of List0, and the scaled forward motion information is given to the subblock at the corresponding position in the current CU; when the backward motion information of the first surrounding block is available, but its forward motion information is unavailable, its backward motion information is scaled to the first frame of List1, and the scaled backward motion information is given to the subblock at the corresponding position in the current CU; when neither the forward motion information nor the backward motion information of the first surrounding block is available, the zero motion information is given to the subblock at the corresponding position in the current CU;

wherein the first surrounding block comprises any decoded neighboring block of the current CU.

13. An encoding method comprises:

determining coordinate information of an initial matching coding unit (CU) of a current CU according to coordinate information of the current CU;

constructing an enhanced temporal candidate list based on the coordinate information of the initial matching CU;

determining coordinate information of a target matching CU corresponding to each Enhanced Temporal Motion Vector Prediction (ETMVP) mode number in the enhanced temporal candidate list by going through ETMVP mode numbers in the enhanced temporal candidate list sequentially;

determining motion information of the target matching CU according to the coordinate information of the target matching CU, wherein the motion information of the target matching CU comprises motion information of each subblock in the target matching CU, and determining motion information of a subblock at a corresponding position in the current CU according to the motion information of each subblock in the target matching CU;

performing motion compensation (MC) on each subblock in the current CU according to the motion information of the subblock in the current CU;

calculating a rate-distortion cost of each ETMVP mode, and comparing the rate-distortion cost with respective rate-distortion costs of other prediction modes to select a prediction mode corresponding to a smallest rate-distortion cost; and recording an ETMVP mode flag and an ETMVP mode index value of the selected prediction modes into a bitstream to be transmitted to a decoding device.

14. A decoding device comprising a processor and a machine-readable storage medium, wherein the machine-readable storage medium stores machine-executable instructions that can be executed by the processor, and the processor is configured to execute the machine-executable instructions to implement the method as described in claim 1.

15. An encoding device comprising a processor and a machine-readable storage medium, wherein the machine-readable storage medium stores machine-executable instructions that can be executed by the processor, and the processor is configured to execute the machine-executable instructions to implement the method as described in claim 13.

* * * * *